United States Patent
Ryan et al.

(10) Patent No.: US 9,674,108 B1
(45) Date of Patent: *Jun. 6, 2017

(54) HUB-AND-SPOKE CONNECTION ARCHITECTURE

(71) Applicant: Accenture Global Solutions Limited, Dublin (IE)

(72) Inventors: Jeffrey Stanford Ryan, Phoenix, AZ (US); John Stevenson, Fort Worth, TX (US); Bahij Nahhas, Round Rock, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,125

(22) Filed: Dec. 30, 2015

(51) Int. Cl.
*G06F 15/173* (2006.01)
*H04L 12/911* (2013.01)
*H04L 29/08* (2006.01)

(52) U.S. Cl.
CPC .............. *H04L 47/70* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,419,857 B1 * | 8/2016 | Ryan | H04L 63/08 |
| 2014/0053060 A1 * | 2/2014 | Walker | G06F 17/2247 |
| | | | 715/234 |
| 2014/0365549 A1 * | 12/2014 | Jenkins | G06F 9/526 |
| | | | 709/201 |
| 2014/0379897 A1 * | 12/2014 | Stroomer | H04L 43/50 |
| | | | 709/224 |
| 2015/0100684 A1 * | 4/2015 | Maes | G06F 11/3672 |
| | | | 709/224 |
| 2015/0188949 A1 * | 7/2015 | Mahaffey | H04L 63/20 |
| | | | 726/1 |
| 2015/0339136 A1 * | 11/2015 | Suryanarayanan | G06F 9/455 |
| | | | 718/1 |
| 2016/0132310 A1 * | 5/2016 | Koushik | H04L 67/10 |
| | | | 717/176 |

FOREIGN PATENT DOCUMENTS

CN          101018181 A   *   8/2007

* cited by examiner

*Primary Examiner* — Kostas Katsikis
(74) *Attorney, Agent, or Firm* — Harrity & Harrity, LLP

(57) ABSTRACT

A system, may include a private cloud network operated by an operator for a client. The private cloud network may be connected to a public cloud network that operates a web platform and a plurality of groups of gateway devices. A first group of gateway devices may be located at an operator data center associated with the operator, and may provide connectivity for the operator data center to connect to the public cloud network via the private cloud network. A second group of gateway devices may be located at a client data center associated with the client, and may provide connectivity for the client data center to connect to the public cloud network via the private cloud network. The private cloud network may be connected to the public cloud network, the operator data center, and the client data center in a hub-and-spoke connection configuration.

20 Claims, 12 Drawing Sheets

HUB-AND-SPOKE CONNECTION ARCHITECTURE

BACKGROUND

A cloud-based computing platform may be utilized to operate a set of servers associated with a web platform. The cloud-based computing platform may include a scalable set of computing resources that may be selectively assignable to a particular portion of the web platform or to perform a particular function of the web platform. For example, a user of the cloud-based computing platform may request and may be provided a first quantity of computing resources to manage a first quantity of demand and a second quantity of computing resources to manage a second quantity of demand.

SUMMARY

According to some possible implementations, a system may include a private cloud network. The private cloud network may be operated by an operator for a client. The private cloud network may be connected to a public cloud network that operates a web platform. The private cloud network may be connected to a plurality of groups of gateway devices. A first group of gateway devices, of the plurality of groups of gateway devices, may be located at an operator data center associated with the operator. The first group of gateway devices may provide connectivity for the operator data center to connect to the public cloud network via the private cloud network. A second group of gateway devices, of the plurality of groups of gateway devices, may be located at a client data center associated with the client. The second group of gateway devices may provide connectivity for the client data center to connect to the public cloud network via the private cloud network. The private cloud network may be connected to the public cloud network, the operator data center, and the client data center in a hub-and-spoke connection configuration.

According to some possible implementations, a method may include receiving, by a device, configuration information associated with configuring routing for a system. The system may include a public cloud network, a private cloud network, an operator data center, a franchisor data center, and one or more franchisee data centers. The public cloud network may be associated with operating a web platform for receiving a product order relating to a take-out or delivery of a food product. The system may be configured in a hub-and-spoke connection configuration. The method may include selectively propagating, by the device, the configuration information associated with configuring routing for the system. The configuration information may include one or more routes for routing information from/to the public cloud network. The method may include receiving, by the device, payload data for routing from a first spoke of the hub-and-spoke connection configuration to a second spoke of the hub-and-spoke connection configuration, after selectively propagating the configuration information. The method may include selectively routing, by the device, the payload data to the second spoke of the hub-and-spoke connection configuration.

According to some possible implementations, a non-transitory computer-readable medium may store one or more instructions that, when executed by one or more processors, may cause the one or more processors to receive configuration information associated with configuring routing for a system. The system may include a public cloud network providing an ecommerce web platform, a private cloud network providing routing of information, an operator data center providing operation services, and a plurality of client data centers connected to a plurality of store locations associated with the ecommerce web platform. The system may be configured in a hub-and-spoke connection configuration. The configuration information may include information identifying one or more routes for directing network traffic of the system. The one or more instructions, when executed by the one or more processors, may cause the one or more processors to selectively propagate by the device, the configuration information associated with configuring routing for the system to cause payload data to be directed via the one or more routes for directing network traffic of the system. The one or more instructions, when executed by the one or more processors, may cause the one or more processors to receive payload data for routing after selectively propagating the configuration information. The one or more instructions, when executed by the one or more processors, may cause the one or more processors to selectively route the payload data based on the configuration information.

DETAILED DESCRIPTION

The following detailed description of example implementations refers to the accompanying drawings. The same reference numbers in different drawings may identify the same or similar elements.

A cloud-based computing platform may facilitate a scalable allocation of computing resources, such as processing resources, storage resources, routing resources, or the like. A user of the cloud-based computing platform may request a first quantity of resources at a first time and a second quantity of resources at a second time. Additionally, or alternatively, allocation of resources may occur automatically as a functionality of the cloud-based computing platform and without the user being required to manually configure the allocation of resources. The cloud-based computing platform may support a web platform (e.g., a website supported by a cloud-based platform), such as a web platform associated with facilitating ordering and delivery of a food product or another type of web platform. The cloud-based computing platform may receive information from and/or transmit information to one or more devices associated with one or more data centers.

However, an operator, which is associated with a first group of data centers, may be assigned to operate the cloud-based computing platform for a client, which is associated with a second group of data centers, rather than the client operating the cloud-based computing platform. Implementations, described herein, may utilize a hub-and-spoke connection configuration to provide security for the cloud-based computing platform and permit a first entity (e.g., the operator) to operate the cloud-based computing platform for a second entity (e.g., the client). In this way, the hub-and-spoke connection configuration may facilitate improved information security, cloud-based computing platform control, or the like relative to another connection configuration, such as a set of direct connections. Moreover, the hub-and-spoke connection configuration may permit network traffic metering and dynamic network traffic resource allocation, thereby improving network performance relative to a static resource allocation.

Figure 1:
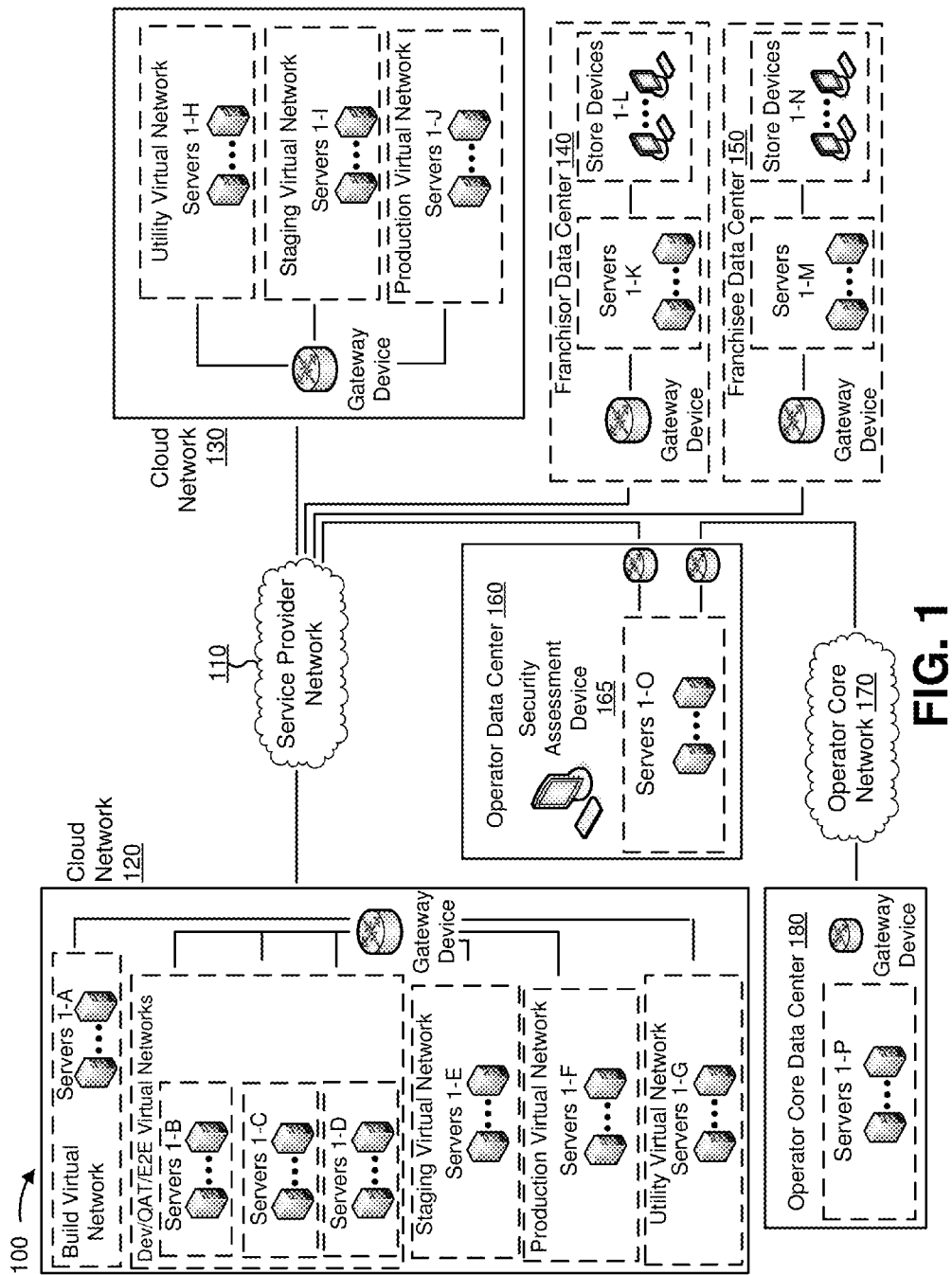
FIG. 1 is a diagram of an example environment in which systems and/or methods, described herein, may be implemented.

FIG. 1 is an overview of an example environment 100 in which systems and/or methods, described herein, may be implemented. Devices of environment 100 may interconnect via wired connections, wireless connections, or a combination of wired and wireless connections.

Service provider network 110 may include one or more wired and/or wireless networks. For example, service provider network 110 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an enterprise network, or the like, and/or a combination of these or other types of networks. In some implementations, service provider network 110 may include a backbone network, such as a backbone network of a telecom service provider, an internet service provider, or the like. For example, service provider network 110 may include a multiprotocol label switching (MPLS) backbone virtual private network (VPN) associated with providing interconnectivity to multiple sub-networks, data centers, or the like, such as an AT&T NetBond virtual private network (VPN) core. In some implementations, service provider network 110 may connect to cloud network 120 via an Azure ExpressRoute connection. In some implementations, service provider network 110 may include a private cloud network. For example, service provider network 110 may include a set of edge devices, routing devices, or the like in a hub-and-spoke connection configuration, which may permit virtual routing and forwarding, as described herein with regards to FIGS. 8-10.

Cloud network 120 and/or another cloud network described herein (e.g., cloud network 130 or the like) may include a cloud-based computing platform providing one or more computing resources, such as a Microsoft Azure cloud, an Amazon web services (Amazon AWS) cloud, or the like. For example, cloud network 120 may include one or more servers, routers, gateways, switches, hubs, data storage units, or the like assignable for one or more functionalities of a web platform. In some implementations, cloud network 120 may facilitate scaling of computing resources. For example, cloud network 120 may assign a first quantity of computing resources for processing user requests for food delivery at a first time and a second quantity of computing resources for processing user requests for food delivery at a second time based, respectively, on computing resource demand at the first time and the second time. In some implementations, cloud network 120 may include a set of virtual networks. A virtual network may include a set of computing resources conceptually grouped with a set of virtualized network links. For example, the virtual network may include a set of virtual machines, a set of virtual firewalls, or the like that are connected via one or more virtual network links.

In some implementations, cloud network 120 may include a set of servers, gateways, firewall devices, or the like. For example, cloud network 120 may include a set of physical servers providing assignable computing resources, a set of virtualized servers representing the assignable computing resources, or the like. A server, as described herein, may refer to a physical server that is associated with cloud network 120, a virtualized server (e.g., a conceptual representation of computing resources that are at least partially implemented in hardware and are allocated by cloud network 120 for a particular functionality), or the like. In some implementations, a server may represent a group of servers. For example, although a production virtual network (described herein) may be described as including a customer portal server, the production virtual network may include a group of customer portal servers (e.g., 5 servers, 10 servers, 20 servers, or the like) that may be scaled based on demand for access to the customer portal. Similarly, a gateway device may refer to a physical gateway device, a virtualized gateway device (e.g., a set of computing resources that are at least partially implemented in hardware and are assigned to perform one or more functionalities of a gateway device), or the like. In other words, a virtual network may be assigned a set of computing resources, which may be conceptually described as servers, gateways, firewalls, or the like.

Cloud network 120 may include, in the set of virtual networks, a build virtual network, in some implementations. For example, cloud network 120 may designate a portion of computing resources (e.g., "Servers 1-A") as allocated for functionalities of the build virtual network. Similarly, cloud network 120 may include a development ("Dev") virtual network, a quality assurance testing (QAT) virtual network, and an end to end testing (E2E) virtual network with portions of computing resources allocated thereto (e.g., servers "1-B," "1-C," and "1-D," respectively). Similarly, cloud network 120 may include a staging virtual network (e.g., with computing resources, "Servers 1-E"), a production virtual network (e.g., with computing resources, "Servers 1-F"), a utility virtual network (e.g., with computing resources, "Servers 1-G"), and a gateway device (e.g., a quantity of computing resources allocated for performing network gateway functions). In some implementations, cloud network 120 may include a resource allocation management device associated with dynamically scaling computing resources of one or more portions of cloud network 120. For example, cloud network 120 may utilize a scaling controller (e.g., a resource allocation management device that selectively allocates and/or reallocates computing resources) to assign a quantity of computing resources to a portion of cloud network 120.

Cloud network 130 may include a set of virtual networks, in some implementations. For example, cloud network 130 may include a utility virtual network (e.g., with computing resources, "Servers 1-H"), a staging virtual network (e.g., with computing resources, "Servers 1-I"), a production virtual network (e.g., with computing resources, "Servers 1-J"), and a gateway device. Collectively, cloud network 120 and cloud network 130 (and/or one or more other, similar cloud networks) may support a web platform, such as an end to end ecommerce platform for food delivery, in some implementations. For example, cloud network 120 and cloud network 130 may facilitate order processing, store administration, inventory management, or the like.

Some virtual networks of cloud network 120 may correspond to other virtual networks of cloud network 130. For example, a first production virtual network of cloud network 120 may correspond to a second production virtual network of cloud network 130. In this case, network traffic may be routed to one of the first production virtual network or the second production virtual network based on a set of load balancing criteria, a set of backup criteria, a set of geographic criteria, or the like. For example, cloud network 120 may be established for managing network traffic associated with the East Coast of the United States, cloud network 130 may be established for managing network traffic associated with the West Coast of the United States, and one or more other cloud networks may be established for managing other network traffic, as backup cloud networks, or the like. In this way, cloud network 120 and cloud network 130 may increase web platform robustness relative to a single cloud network based on facilitating redundancy of virtual networks.

Additionally, or alternatively, some virtual networks of cloud network 120 may not correspond to other virtual networks of cloud network 130. For example, testing operations may be designated as non-critical operations (e.g., if one or more computing resources associated with performing program code testing are unavailable, operation of the web platform may remain unaffected for customers). In this case, testing operations may be performed in cloud network 120 utilizing the development, QAT, and E2E virtual networks and corresponding virtual networks may not be established in cloud network 130. In this way, resource allocation is reduced (e.g., by not duplicating testing operations) and program code continuity may be improved (e.g., by reducing a likelihood of discontinuity resulting from testing operations being performed in multiple different environments without centralized control) relative to a configuration that duplicates testing operations across each cloud network. The set of virtual networks are described in additional detail with regard to FIGS. 2 through 7.

Franchisor data center 140 may include one or more data centers operated by a franchisor. For example, franchisor data center 140 may include a gateway device, a set of computing resources (e.g., "Servers 1-K"), and a set of store devices (e.g., "Store Devices 1-L:"). The set of store devices may refer to one or more devices (e.g., point of sale (POS) devices) associated with receiving an order for food delivery from a store location, generating pricing information for the order, assigning the order for fulfillment by the store location (e.g., adding items of the order to a preparation queue), or the like. In some implementations, the set of store devices may include multiple types of store devices associated with multiple information formats. For example, a first store location may utilize a first type of store device and a second store location may utilize a second type of store device. In this case, one or more portions of cloud network 120, cloud network 130, or the like may be designated for altering an order, received via a web platform, to a format associated with a particular store device associated with a store location assigned for fulfilling the order.

In some implementations, franchisor data center 140 may receive configuration information from operator data center 160. For example, a device (e.g., a control device, such as a user console) of operator data center 160 may connect to a gateway device (e.g., another edge device) of franchisor data center 140 (e.g., via an authentication and authorization procedure, such as a two-factor authentication procedure or the like), and may utilize the connection to the gateway device to cause an alteration to a configuration of the gateway device, to cause the gateway device to propagate (e.g., via a border gateway protocol (BGP) message) a route associated with routing payload data between the gateway device and cloud network 120 or cloud network 130, or the like. In this case, the gateway device (or a group of gateway devices) of franchisor data center 140 may store information identifying the one or more routes, and may utilize the one or more routes for transmitting information (e.g., to cloud network 120, cloud network 130, or the like). Similarly, the device of operator data center 160 may connect to a gateway device of operator data center 160 to cause an alteration to a configuration of the gateway device, to propagate a route associated with routing payload data between the gateway device and cloud network 120 or cloud network 130, or the like. In this way, operator data center 160 may centralize control of routing for one or more franchisor data centers 140 (and/or franchisee data centers 150), thereby reducing a likelihood of errors associated with incorrect routing relative to permitting each data center to control routing separately.

Franchisee data center 150 may include one or more data centers operated by a franchisee of the franchisor. For example, a commercial entity separate from the franchisor may operate a set of store locations as a franchisee of the franchisor, and may operate a data center with a set of computing resources (e.g., a gateway device, a set of servers "1-M," a set of store devices "1-N," etc.), separated from franchisor data center 140, for managing store operations, order allocation, or the like, but may utilize the same web platform as the franchisor (and/or one or more franchisees thereof that lack a separate data center). In this case, one or more computing resources of franchisee data center 150 may provide information to the web platform (e.g., via cloud network 120, cloud network 130, etc.), receive information from the web platform, or the like. In some implementations, franchisee data center 150 may receive configuration information from operator data center 160. For example, a device of operator data center 160 may connect to a gateway device of franchisee data center 150, and may alter a configuration of the gateway device, cause the gateway device to transmit a BGP message identifying one or more routes for routing payload data between franchisee data center 150 and cloud network 120 or cloud network 130, or the like. In this case, the gateway device (or a group of gateway devices) of franchisee data center 150 may store information identifying the one or more routes, and may utilize the one or more routes for transmitting information (e.g., to cloud network 120, cloud network 130, or the like).

Operator data center 160 may include one or more data centers operated by an operator of the web platform. For example, the franchisor may contract with the operator to provide services for the web platform relating to operation, such as security services, maintenance services, program code generation, testing, and updating services, or the like. In this case, the operator may utilize an operator data center with a set of gateway devices, a set of computing resources (e.g., "Servers 1-O"), or the like to perform one or more functionalities associated with operating the web platform of cloud network 120, cloud network 130, or the like. In some implementations, operator data center 160 may provide configuration information for one or more gateway devices of franchisor data center 140, franchisee data center 150, or the like. For example, operator data center 160 (e.g., a device of operator data center 160, such as a user console device) may cause BGP extended community messages to be transmitted to identify routes for routing payload data based on connecting to gateway devices (e.g., of operator data center 160, of franchisee data center 155, of franchisor data center 150, etc.). In this case, operator data center 160 may include routes permitting routing to/from cloud network 120 or cloud network 130, and may omit routes permitting routing of payload data between franchisor data center 140, franchisee data center 150, and operator data center 160, thereby reducing a likelihood that an error at a particular data center is propagated to other data centers.

Security assessment device 165 may refer to one or more devices associated with performing a security assessment for a cloud network, one or more devices and/or computing resources of the cloud network, a web platform associated with the cloud network, or the like. For example, security assessment device 165 may include a desktop computer, a laptop computer, a tablet computer, a mobile phone (e.g., a smart phone, a radiotelephone, etc.), a server, or a similar type of device. In some implementations, security assessment device 165 may communicate with and/or control one or more devices and/or computing resources described herein to obtain information regarding a security situation, monitor a security situation, remediate a security situation, perform a response action to a security situation, classify a security situation, assign one or more tasks to one or more users based on a security situation, or the like. Although security assessment device 165 is depicted as being included in operator data center 160, security assessment device 165 may be included with another group of devices, such as in cloud network 120, cloud network 130, operator core data center 180, or the like.

Operator core network 170 include one or more wired and/or wireless networks. For example, operator core network 170 may include a cellular network, a PLMN, a LAN, a WAN, a MAN, a telephone network, a private network, an ad hoc network, an intranet, the Internet, a fiber optic-based network, a cloud computing network, an enterprise network, or the like, and/or a combination of these or other types of networks. In some implementations, operator core network 170 may facilitate connectivity between one or more computing resources of operator data center 160 and one or more computing resources of operator core data center 180.

Operator core data center 180 may include one or more data centers operated by the operator of the web platform. For example, the operator may utilize a set of operator data centers 160 that communicate directly with cloud network 120, cloud network 130, or the like and a set of operator core data centers 180 that provide backend services for operator data centers 160. In some implementations, operator core data center 180 may include a set of computing resources (e.g., a gateway device, "Servers 1-P," or the like).

In this way, environment 100 may utilize cloud networks, allocated into groups of virtual networks, to facilitate multi-layer security within a virtual network (e.g., by utilizing cloud scalability functionalities to operate layers of security that could require an infeasible quantity of resources if the resources were allocated in a fixed manner), security designed hub-and-spoke configured virtual networks for program code testing and implementation operations (e.g., by utilizing cloud scalability functionalities to separate testing and implementation operations into multiple separated virtual networks that are allocated resources in a scaling manner), security operations (e.g., by utilizing virtualization to reallocate and reconfigure portions of environment 100 on an as-needed basis to respond to security situations), and routing operations (e.g., by utilizing BGP messaging to propagate route information).

The number and arrangement of devices, computing resources, and networks shown in FIG. 1 are provided as an example. In practice, there may be additional devices, computing resources, and/or networks, fewer devices, computing resources, and/or networks, different devices, computing resources, and/or networks, or differently arranged devices, computing resources, and/or networks than those shown in FIG. 1. Furthermore, two or more devices and/or computing resources shown in FIG. 1 may be implemented within a single device or computer resource allocation, or a single device and/or computing resource allocation shown in FIG. 1 may be implemented as multiple, distributed devices and/or computing resources. Additionally, or alternatively, a set of devices (e.g., one or more devices) and/or computing resources of environment 100 may perform one or more functions described as being performed by another set of devices and/or computing resources of environment 100.

Figure 2:
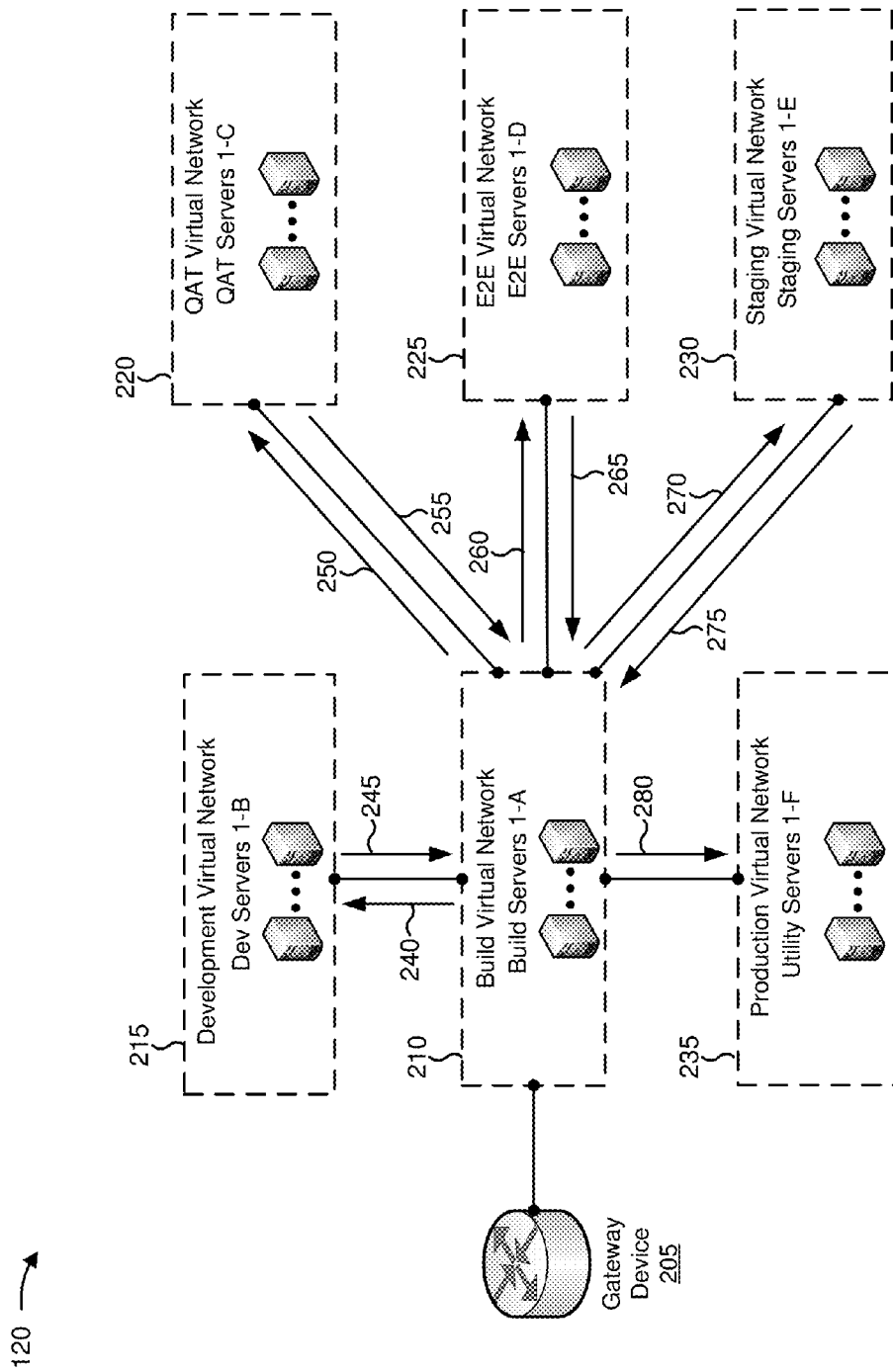
FIG. 2 is a diagram of a hub-and-spoke development environment relating to a cloud network shown in FIG. 1.

FIG. 2 is a diagram of an example of virtual networks of cloud network 120 of FIG. 1. FIG. 2 shows an example of a hub-and-spoke development environment.

As shown in FIG. 2, cloud network 120 may include a gateway device 205 that facilitates a direct connection to cloud network 120. For example, a server of operator data center 160 may utilize a direct connection associated with gateway device 205 to access, control, and/or utilize computing resources of cloud network 120 (e.g., a Microsoft Azure ExpressRoute connection, an Amazon AWS Direct Connect connection, etc.). In some implementations, gateway device 205 may include an MPLS gateway device, a virtualized gateway device, or the like. In some implementations, a server of franchisor data center 140, franchisee data center 150, and/or operator data center 160 may include a first connection to service provider network 110, and service provider network 110 may include a second connection to cloud network 120. For example, the server may transmit information from a first edge router of operator data center 160 toward a second edge router of service provider network 110 (e.g., as part of an AT&T NetBond virtual private network (VPN)), and the second edge router may utilize BGP routing information to direct the information to cloud network 120 via a Microsoft Azure ExpressRoute connection.

As shown, cloud network 120 may include a build virtual network 210, which may connect to development virtual network 215 (e.g., a group of development servers), QAT virtual network 220 (e.g., a group of QAT servers), E2E virtual network 225 (e.g., a group of E2E testing servers), staging virtual network 230 (e.g., a group of staging servers), and/or production virtual network 235 (e.g., a group of production servers). In some implementations, development virtual network 215, QAT virtual network 220, and/or E2E virtual network 225 may be configured as different virtual networks. Additionally, or alternatively, development virtual network 215, QAT virtual network 220, and/or E2E virtual network 225 may be configured as portions of the same virtual network, such as sub-virtual networks, computing resource groups, or the like. In some implementations, the hub-and-spoke development environment may include a set of gateway devices, such as a gateway device separating each virtual network, such as separating development virtual network 215 from build virtual network 210, separating QAT virtual network 220 from build virtual network 210, or the like.

As further shown in FIG. 2, build virtual network 210 may facilitate development of a web platform using a hub-and-spoke development environment. For example, when a developer generates program code for utilization in the web platform, the program code is provided to a build server of build virtual network 210. In some implementations, build virtual network 210 may progress a development update through multiple different stages of development of the hub-and-spoke development environment. For example, build virtual network 210 may provide a development update (e.g., a program code for altering the web platform) to development virtual network 215 as a first stage of development, may receive information indicating that a set of testing criteria of development virtual network 215 are satisfied by the development update, and may provide the development update to QAT virtual network 220 as a second stage of development. Similarly, build virtual network 210 may provide the development update as a first stage of development to staging virtual network 230, and may subsequently provide the development update as a second stage of development to production virtual network 235.

In some implementations, cloud network 120 may include multiple versions of a particular virtual network. For example, cloud network 120 may include a first development virtual network 215, a second development virtual network 215, or the like. In this case, build virtual network 210 may progress a development update from a first sub-stage of development of a first stage of development at first development virtual network 215 to a second sub-stage of development of the first stage of development at second development virtual network 215. In some implementations, build virtual network 210 may omit a stage of development. For example, for a development update determined to be time-sensitive, build virtual network 210 may progress a development update from QAT virtual network 220 to staging virtual network 230 without testing the development update via E2E virtual network 225.

In some implementations, build virtual network 210 may progress multiple development updates concurrently. For example, build virtual network 210 may cause a first development update and a second development update to be tested via first development virtual network 215, a third development update to be tested via second development virtual network 215, and a fourth development update to be tested via QAT virtual network 220. In this case, build virtual network 210 may cause code from the fourth development update to be integrated into the first, second, and third development update when the fourth development update is implemented and without causing the first, second, and third development updates to return to a previous stage of development.

In some implementations, the build server may store the program code, perform authentication of the program code (e.g., determine that the user is authorized to provide the program code for the web platform), perform version control on the program code, perform documentation of the program code, perform security scanning of the program code (e.g., determining that the program code lacks malicious code), or the like. In some implementations, build virtual network 210 may facilitate establishment of a virtual machine with which a user may control authentication of the program code, version control of the program code, or the like.

In some implementations, cloud network 120 may scale computing resources to facilitate performing authentication of the program code, version control of the program code, or the like. For example, when the program code is provided for scanning, cloud network 120 may allocate a first quantity of computing resources to build virtual network 210 to perform scanning and when scanning is completed, cloud network 120 may assign a second quantity of computing resources to build virtual network 210. Additionally, or alternatively, a scaling controller of cloud network 120 may scale computing resources to facilitate performing one or more tests on a development update (e.g., on the program code). For example, when development virtual network 215 is directed to perform one or more tests on the program code, the scaling controller may allocate a first quantity of computing resources to development virtual network 215 and when development virtual network 215 has competed the one or more tests, the scaling controller may allocate a second quantity of computing resources, to development virtual network 215, that is less than the first quantity of computing resources.

Based on separating the functionalities of program code testing into multiple different virtual networks, cloud network 120 may increase security of program code testing relative to performing testing on a single computing device, however, establishing multiple different virtual networks may be resource intensive. Based on utilizing cloud-based scaling of computing resources, cloud network 120 may achieve security benefits associated with separating program code testing into multiple different virtual networks and reduce resource allocation, by allocating computing resources to each virtual network on an as-needed basis relative to allocating resources to each virtual network on a fixed basis.

As shown by reference number 240, the build server may provide a copy of the program code to a development server of development virtual network 215 (e.g., via a virtualized network link). In some implementations, the development server may perform one or more tests on the program code. For example, the development server may utilize a set of use cases to test the program code and determine whether the program code performs as intended. Further to the example, the development server determines that the program code fails the set of use cases. In this case, assume the development server may provide information associated with failing a development test (e.g., a test associated with the set of use cases), such as information identifying a portion of the program code associated with the failure, information identifying a module associated with the failure, information identifying the set of use cases, or the like. Further to the example, the development server may provide information to the build server associated with causing the program code to be rejected. In this case, the program code may be replaced by other program code for testing via development virtual network 215. As another example, the development server may determine that the program code passed the set of use cases, and may provide information, to the build server, indicating that the program code passed the set of use cases, as shown by reference number 245.

Based on receiving information indicating that the program code passed the set of use cases and/or one or more testing criteria of development virtual network 215, the build server of build virtual network 210 may generate information associated with the program code, in some implementations. For example, the build server may provide information indicating that the program code passed the set of use cases and may update information associated with tracking a development lifecycle of the program code. In this case, the build server may cause the information to be provided to a client device being operated by a developer managing program code testing, a data structure tracking the development lifecycle of the program code, or the like. As shown by reference number 250, the build server may provide the program code to a QAT server of QAT virtual network 220 based on receiving information indicating that the program code passed the set of use cases of development virtual network 215.

In some implementations, the QAT server may perform QAT testing on the program code. For example, the QAT server may perform unit testing on the program code, static code analysis, data flow analysis, metrics analysis, code coverage analysis, and/or another type of program code testing. As an example, the QAT server may determine that the program code does not pass on or more QAT tests, and may cause the program code to be rejected by the build server. In this case, when other program code is generated to replace the program code, the build server may perform version control on the program code and the other program code, and may cause the other program code to be provided for testing via development virtual network 215. As another example, the QAT server may determine that the program code passed QAT testing. In this case, the QAT server may provide, to the build server of build virtual network 210, information associated with indicating that the program code passed the QAT testing, such as testing results or the like, as shown by reference number 255.

Based on receiving information indicating that the program code passed the QAT testing and/or one or more testing criteria associated with QAT virtual network 220, the build server of build virtual network 210 may generate information associated with the program code, in some implementations. For example, the build server may provide information, to the client device utilized by the developer, indicating that the program code passed the QAT testing. Additionally, or alternatively, the build server may provide information associated with comparing the program code to other program code based on the QAT testing. As shown by reference number 260, the build server may provide the program code to an E2E server of E2E virtual network 225 based on receiving information indicating that the program code passed the QAT testing.

In some implementations, the E2E server may perform E2E testing on the program code. For example, the E2E server may perform one or more tests associated with determining whether the program code integrates properly with one or more other modules of the web platform (e.g., integration with a Hybris data hub, integration with an Apigee application programming interface (API), or the like). Additionally, or alternatively, the E2E server may determine whether the program code integrates with one or more data structures, one or more network connections, or the like.

In some implementations, the E2E server may determine that that the program code does not pass one or more E2E tests. For example, the E2E server may determine that the program code does not integrate properly with a server associated with the web platform, and may provide information to the build server of build virtual network 210 indicating that the program code does not pass the E2E testing. In this case, the build server may perform version control, provide information regarding the E2E testing, or the like. When build virtual network 210 receives a subsequent version of the program code, the build server may process the subsequent version and provide the processed subsequent version to development virtual network 125, as described above in connection with reference number 240. In some implementations, the E2E server may determine that the program code passes the E2E testing. For example, the E2E server may determine that the program code properly integrates with the server associated with the web platform. In this case, the E2E server may provide, to the build server of build virtual network 210, information associated with indicating that the program code passed the E2E testing, such as testing results or the like, as shown by reference number 265.

Based on receiving information indicating that the program code passed the E2E testing, the build server of build virtual network 210 may generate information associated with the program code, in some implementations. For example, the build server may provide information, to the client device utilized by the developer, indicating that the program code passed the E2E testing, may update information associated with tracking the development lifecycle of the program code, may perform version management for the program code, or the like. Based on the program code passing the E2E testing (e.g., satisfying one or more criteria of E2E virtual network 225), the build server may provide the program code to a staging server of staging virtual network 230, as shown by reference number 270.

In some implementations, the staging server may facilitate pre-production evaluation of program code, such as by testing incorporation of the program code into a module that is utilized in production virtual network 235. For example, staging virtual network 230 may correspond to and/or resemble production virtual network 235 (e.g., a virtual network associated with the web platform), and the staging server may execute the program code to determine whether the program code will operate as intended when utilized by the module in production virtual network 235. In some implementations, the staging server may perform a set of pre-production tests on the program code. For example, the staging server may facilitate user experience testing, user acceptance testing, compatibility testing (e.g., determining whether the program code is compatible with hardware and/or software configurations of production virtual network 235), or the like.

In some implementations, the staging server may perform performance testing of program code. For example, the staging server may execute the program code to determine a set of performance metrics relating to the program code, such as a metric relating to page views (e.g., a quantity of page views per hour that can be received when utilizing the program code, a quantity of page views per hour that are received when utilizing the program code, an average page views per second metric, a quantity of application programming interface calls per page view, a peak transactions per second (TPS) value, etc.), a metric relating to memory resources (e.g., a quantity of memory required to store the program code, to store information generated based on executing the program code, etc.), a metric relating to processing resources (e.g., a quantity of processing resources utilized when executing the program code), or the like. In this way, the staging server may provide feedback regarding performance of the program code. In some implementations, program code may be rejected when a performance threshold is not satisfied. In some implementations, a portion of program code may be selected from a set of portions of program code based on respective performance metrics associated with the set of portions of program code.

In some implementations, the staging server may provide, to a build server of build virtual network 210, information indicating that the program code does not pass a set of pre-production tests. For example, the staging server may indicate that the program code caused undesired behaviors in a version of the web platform associated with staging virtual network 230 corresponding to and/or resembling the web platform associated with production virtual network 235. In this case, the build server may cause other program code to be provided for testing via development virtual network 215 as a potential replacement for the program code. In some implementations, the staging server may provide information indicating that the program code passed the set of pre-production tests. For example, the staging server may provide information indicating that the program code satisfies a set of user experience thresholds, a set of performance threshold, or the like, as shown by reference number 275.

Based on receiving information indicating that the program code passed the set of pre-production tests and/or satisfied one or more testing criteria associated with staging virtual network 230, the build server of build virtual network 210 may generate information associated with the program code, in some implementations. For example, the build server may provide information, to the client device utilized by the developer, indicating that the program code passed the set of pre-production tests, may update information associated with tracking the development lifecycle of the program code, may perform version management for the program code, or the like. In some implementations, the build server may cause the program code to be scheduled for integration into production virtual network 235 (e.g., to the web platform associated with production virtual network 235). For example, the build server may add the program code to a scheduled update, may provide information indicating that the program code is in a condition that is ready for release, or the like.

As shown by reference number 280, based on the program code passing tests associated with development virtual network 215, QAT virtual network 220, E2E virtual network 225, and staging virtual network 230, build virtual network 210 may cause the program code to be provided to a production server of production virtual network 235 for utilization with the web platform. For example, the build server may cause a portion of the web platform to be adjusted to integrate the program code.

If at any stage, build virtual network 210 receives information indicating that the program code has not passed a set of tests and build virtual network 210 receives a subsequent version of the program code, the build server may process the subsequent version of the program code and provide the processed subsequent version of the program code to development virtual network 215. In this way, build virtual network 210 may ensure that a subsequent version of the program code has not been altered in a way that causes the subsequent version to fail the set of tests and/or another set of tests that are intended to be performed on program code.

In this way, a build virtual network may utilize a hub-and-spoke configuration to facilitate development, testing, and integration of program code for a web platform. By centralizing administration of the development, testing, and integration of the program code with the build virtual network, the build virtual network may facilitate improved authentication of program code, reduced likelihood of misuse or misrepresentation of program code, improved version control for the program code, improved documentation of the program code, improved security scanning for the program code, or the like relative to a non-centralized environment. By utilizing different virtual networks for each phase of testing, the build virtual network may reduce, relative to a single testing environment, a likelihood of malicious alteration of a testing environment to cause malicious program code to pass tests of the testing environment.

As indicated above, FIG. 2 is provided merely as an example. Other examples are possible and may differ from what was described with regard to FIG. 2.

Figure 3:
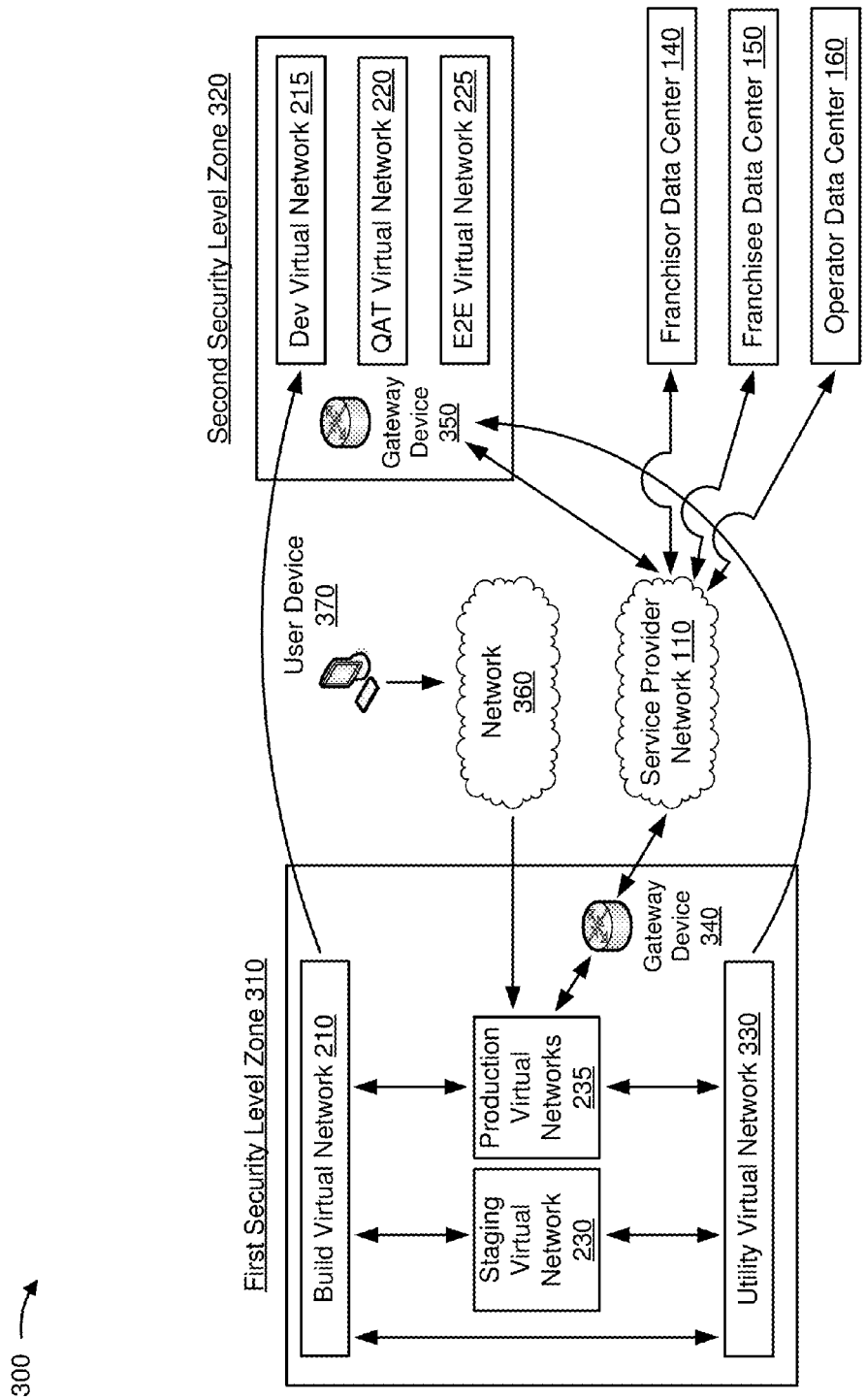
FIG. 3 is a diagram of a set of security level zones relating to the example environment shown in FIG. 1.

FIG. 3 is a diagram of an example implementation 300 illustrating a set of security level zones relating to the example environment shown in FIGS. 1 and 2.

As shown in FIG. 3, a conceptual illustration of portions of example environment 100 may include a first security level zone 310 and a second security level zone 320. A security level zone may refer to a zone (e.g., a conceptual representation of a set of portions of cloud network 120, cloud network 130, or the like) satisfying a particular level of security. For example, first security level zone 310 may include portions of cloud network 120 satisfying compliance with payment card industry data security standard (PCI compliance), compliance with personally identifiable information data security standard (PII compliance), or the like and second security level zone 320 may include portions of cloud network 120 not satisfying PCI compliance, PII compliance, or the like.

In some implementations, first security level zone 310 may include build virtual network 210, staging virtual network 230, production virtual network 235, a utility virtual network 330 (e.g., a virtual network providing one or more functionalities for one or more other virtual networks, such as providing a set of security utilities, a code documentation utility, or the like), and a gateway device 340. For example, each of build virtual network 210, staging virtual network 230, production virtual network 235, utility virtual network 330, and gateway device 340 may be configured to be PCI compliant. In some implementations, second security level zone 320 may include development virtual network 215, QAT virtual network 220, E2E virtual network 225, and a gateway device 350. For example, each of development virtual network 215, QAT virtual network 220, E2E virtual network 225, and gateway device 350 may be configured without PCI compliance.

Utility virtual network 330 may refer to a virtual network (e.g., of cloud network 120, cloud network 130, or the like) associated with providing utilities for one or more other virtual networks. For example, utility virtual network 330 may include a set of tools, such as a security tool (e.g., a malicious file scanning tool, a file integrity monitoring tool, a logging tool, or the like), that may be utilized by computing resources of one or more other portions of cloud network 120. In this case, a server of a portion of production virtual network 235 may utilize a malicious file scanning tool of utility virtual network 330 to determine whether a received file is a malicious file.

In some implementations, cloud network 120 may allocate a quantity of computing resources to utility virtual network 330 for a terminal services module that provides remote computer and virtual machine control to a remote user, such as a developer operating a client device of operator data center 160 or the like. In some implementations, the terminal services module may be associated with a firewall. For example, the terminal services module may be associated with a network security group (NSG) firewall (e.g., a top level object associated with a set of access control rules) utilized to determine whether to allow traffic to a virtual machine, such as the terminal services module. In some implementations, utility virtual network 330 may be designated for PCI compliance based on utilization of tools of utility virtual network 330 by multiple virtual networks that are PCI compliant. In this way, cloud network 120 may avoid an exploit of utility virtual network 330 being utilized to gain access to PCI information of a PCI compliant virtual network.

In some implementations, first security level zone 310 may utilize a different authorization compared with second security level zone 320. For example, gateway device 340 may utilize multi-factor authentication, such as two or more of a knowledge security element (e.g., a password, a personal identification number, an answer to a security question), a possession security element (e.g., a security token), a user security element (e.g., a fingerprint identification, a retina identification, a voice identification), or the like. By contrast, gateway device 350 may utilize single-factor authentication. In this way, first security level zone 310 may provide a higher level of security for virtual networks associated therewith than second security level zone 320. Providing a higher level of security may be more resource intensive, less flexible, or the like relative to a lower level of security. Cloud network 120 and/or cloud network 130 may utilize the higher level of security for virtual networks associated with the web platform to avoid inadvertent disclosure of customer data, malicious alteration to the web platform, or the like, thereby resulting in an enhanced security condition relative to a non-PCI compliant web platform. Moreover, cloud network 120 and/or cloud network 130 may utilize the lower level of security for testing environments, thereby, relative to requiring PCI compliance for testing environments, reducing resource allocation and increasing flexibility for testing environments, in which security information is less likely to be located and with which customers do not interact.

In some implementations, first security level zone 310 (e.g., portion of cloud network 120 conceptually represented as included in first security level zone 310) may receive traffic from network 360 (e.g., Internet traffic from a customer utilizing user device 370 to place an order with production virtual network 235 via the web platform), such as an order for food delivery via a food delivery web platform or another type of product delivery via another type of web platform. User device 370 may include one or more devices, such as a mobile phone, a computer, a video game console, or another type of device that may be utilized to access a web platform. Additionally, or alternatively, first security level zone 310 may receive traffic from service provider network 110 via gateway device 340 (e.g., a terminal services device receiving virtual private network traffic from a developer associated with franchisor data center 140, franchisee data center 150, and/or operator data center 160).

In some implementations, second security level zone 320 may receive traffic from service provider network 110 and from first security level zone 310 (e.g., program code promoted from build virtual network 210, utility functionalities from utility virtual network 315, or the like). For example, program code may be promoted from build virtual network 210 to development virtual network 215, QAT virtual network 220, and/or E2E virtual network 225. In this case, second security level zone 320 may serve as a sandbox environment for a set of developers to test program code without granting administrative access to virtual networks of first security level zone 310 that may include sensitive user information and/or access to critical resources of the web platform. Moreover, second security level zone 320 does not receive traffic from network 360, thereby facilitating the lessened security requirements relative to first security level zone 310, which does receive traffic from network 360.

In this way, a cloud network may improve web platform management for a multi-developer organizations by providing improved information security and by reducing a likelihood of malicious or inadvertent errors being propagated to the web platform relative to a cloud network that does not implement PCI compliance for virtual networks. Moreover, the cloud network may improve web platform management by providing improved flexibility regarding granting access for program code testing relative to a cloud network that implements PCI compliance for all virtual networks.

As indicated above, FIG. 3 is provided merely as an example. Other examples are possible and may differ from what was described with regard to FIG. 3.

Figure 4A:
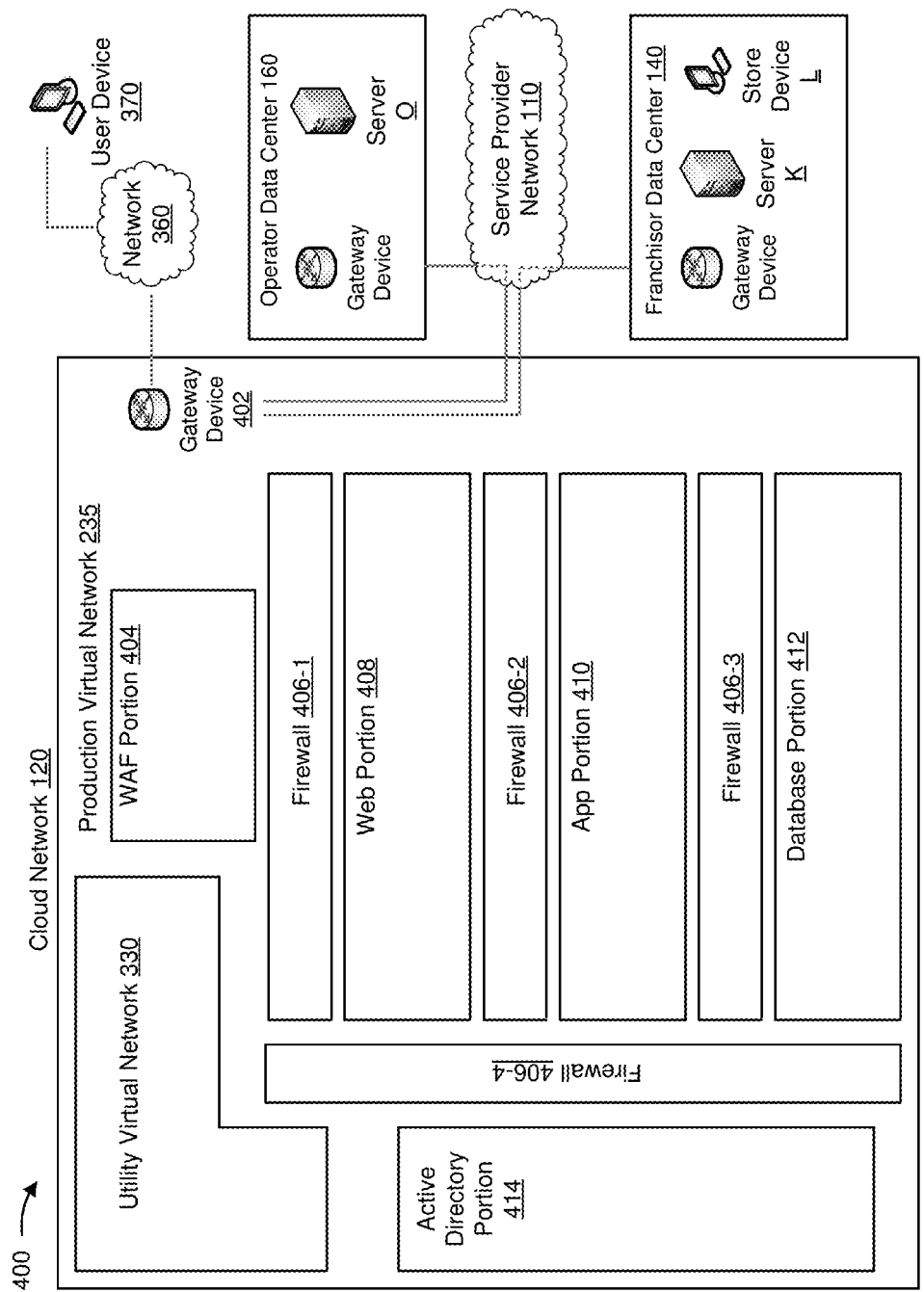
FIGS. 4A and 4B are diagrams of an example of a multi-layer security architecture with firewalled portions of a virtual network relating to the example environment shown in FIG. 1.
Figure 4B:
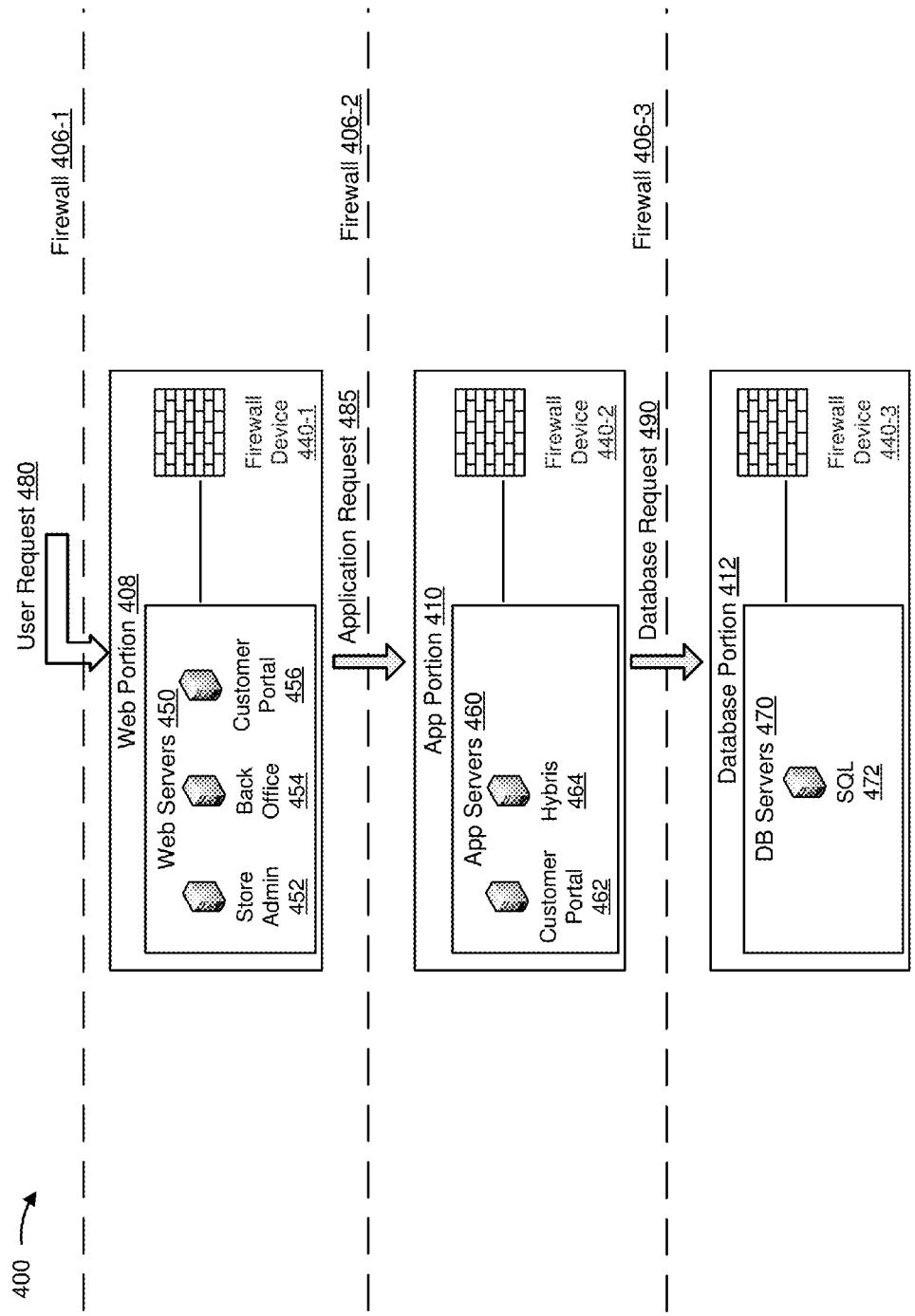

FIGS. 4A and 4B are diagrams of an example implementation 400 relating to example environment 100 shown in FIG. 1. FIGS. 4A and 4B show an example of a multi-layer security architecture with firewalled portions of a virtual network.

As shown in FIG. 4A, cloud network 120 may include production virtual network 235, a utility virtual network 330, and a gateway device 402. Production virtual network 235 may include a web application firewall (WAF) portion 404, a group of firewall 406-1 through 406-4, a web portion 408 (e.g., a web server portion of production virtual network 235), an application ("app") portion 410 (e.g., an application server portion of production virtual network 235), a database portion 412 (e.g., a database server portion of production virtual network 235), and an active directory portion 414. Cloud network 120 may connect, via gateway device 402, to network 360 and service provider network 110. Portions of production virtual network 235 may integrate security tools of utility virtual network 330, which may be conceptually represented and/or instantiated as a utility portion of production virtual network 235. In some implementations, production virtual network 235 may include a scaling controller associated with allocating computing resources to portions of production virtual network 235, a routing device associated with causing information to be routed between portions of production virtual network 235, or the like.

Gateway device 402 may include one or more gateway devices associated with providing traffic routing for production virtual network 235. For example, gateway device 402 may receive virtual private network (VPN) traffic from operator data center 160 (e.g., via service provider network 110) and may route the VPN traffic to a terminal services device of utility virtual network 330. Additionally, or alternatively, gateway device 402 may receive traffic from network 360 (e.g., web traffic), operator data center 160, franchisor data center 140, or the like and may route the traffic to a portion of cloud network 120 (e.g., web portion 408).

WAF portion 404 may include one or more devices associated with providing firewalling for production virtual network 235. For example, WAF portion 404 may include a virtual network (e.g., a sub-virtual network of production virtual network 235) that may receive network traffic from gateway device 402, and may apply a security filter. In this way, WAF portion 404 may reduce a likelihood of a cross-site scripting (XSS) attack, a structured query language (SQL) injection attack, or the like. Based on the traffic satisfying the filter and/or one or more traffic routing criteria of WAF portion 404, the traffic may be routed, via firewall 406-1, to web portion 408, as described in detail with regard to FIG. 4B. In some implementations, WAF portion 404 may perform reverse proxying for user device 370 or the like. For example, when user device 370 attempts to establish a connection, via WAF portion 404, to a customer portal of web portion 408, WAF portion 404 may establish a first connection with user device 370 and a second separate connection with web portion 408, thereby preventing user device 370 from direct access to web portion 408. In this way, WAF portion 404 may provide a layer of security for the web platform. By utilizing cloud-based scaling, cloud network 120 may provide the layer of security on an as needed basis, thereby reducing a resource allocation relative to a fixed allocation for a WAF.

Firewall 406 (hereinafter referred to collectively as "firewalls 406," and individually as "firewall 406") may refer to a firewall associated with providing a layer of security for cloud network 120. For example, firewall 406 may include a network security group (NSG) based firewall associated with managing access between computing resources of portions of cloud network 120. For example, when user device 370 provides information identifying an order for food delivery via WAF portion 404 (e.g., based on satisfying one or more security criteria of WAF portion 404), firewall 406-1 may provide one or more firewall-based filters on the connection established between WAF portion 404 and web portion 408. Similarly, when a server of web portion 408 intends to access information of a server of application portion 410, firewall 406-2 may apply one or more filtering rules to a request for information. In some implementations, firewall 406 may include a virtualized firewall. For example, cloud network 120 may allocate resources to firewalls 406 on an as needed basis, thereby reducing a resource allocation requirement per firewall than a fixed allocation. Moreover, based on reducing the resource allocation requirement per firewall, cloud network 120 may implement more firewalls for separation portions of cloud network 120 than a similar cloud network that is associated with a greater resource allocation requirement per firewall.

Web portion 408 may refer to a portion of cloud network 120 associated with providing information for display via a web platform and/or receiving information from the web platform. For example, a user may request information from cloud network 120 via a web platform by providing a user request to web portion 408, as described herein with regard to FIG. 4B.

Application portion 410 may refer to a portion of cloud network 120 associated with providing application services for the web platform. For example, when web portion 408 receives an order for a food product delivery, web portion 408 may provide the order to application portion 410 for processing, as described herein with regard to FIG. 4B.

Database portion 412 may refer to a portion of cloud network 120 associated with providing information from a database for the web platform. For example, when application portion 410 is processing the order for the food product delivery, application portion 410 may request information (e.g., user identification information, credit card information, or the like from database portion 412 via a database request, and database portion 412 may provide the requested information, as described herein with regard to FIG. 4B.

Active directory portion 414 may refer to a portion of cloud network 120 associated with providing directory services, authentication, and/or authorization for users of cloud network 120. For example, cloud network 120 may allocate a quantity of computing resources to an active directory domain controller of active directory portion 414. Active directory portion 414 may provide another layer of security for cloud network 120, in some implementations. For example, active directory portion 414 may ensure that administrative users (e.g., one or more users of operator data center 160) are only granted access to assigned portions of cloud network 120. In this case, active directory portion 414 may receive an access request from a user and perform authentication of the access request to determine whether to grant access (e.g., to a portion of production virtual network 235) to the user.

As shown in FIG. 4B, web portion 408, application portion 410, and database portion 412 may include firewall devices 440-1, 440-2, and 440-3, respectively. A firewall device 440 may correspond to a firewall 406, may include an interface with a firewall 406, or may include a device separate and/or different from a firewall 406. For example, firewall device 440 may include a virtualized firewall device allocated as a computing resource of web portion 408 (e.g., firewall device 440-1), application portion 410 (e.g., firewall device 440-2), database portion 412 (e.g., firewall device 440-3), or the like. Firewall device 440 may provide a layer of security for a portion of cloud network 120. For example, when a connection is attempted to web portion 408, firewall device 440-1 may apply one or more filters and/or security techniques associated with ensuring that the connection is a not associated with a malicious purpose.

As further shown in FIG. 4B, web portion 408 may include a set of web servers 450 associated with one or more functionalities of the web platform. For example, the set of web servers 450 may include a group of store administration ("admin") servers 452 (e.g., 5 servers, 10 servers, 20 servers, etc.) that provide a portal for utilization one or more functionalities of the web platform associated with store administration. Additionally, or alternatively, the set of web servers 450 may include a group of back office servers 454 that provide a portal for utilization of one or more back office functionalities of the web platform, such as inventory information, payroll information, or the like. Additionally, or alternatively, the set of web servers 450 may include a group of customer portal servers 456 (e.g., one or more web servers) that provide a portal for utilization of one or more customer functionalities of the web platform. For example, user device 370 may provide web traffic (e.g., a request for delivery or take-out of a product, such as a food product) to customer portal servers 456 (e.g., via WAF portion 404).

As further shown in FIG. 4B, application portion 410 may include a set of application ("app") servers 460 associated with one or more application services of an ecommerce application associated with the web platform. For example, the set of application servers 460 may include a group of customer portal servers 462 associated with providing information for customer portal servers 456. Additionally, or alternatively, the set of application servers 460 may include a group of Hybris servers 464 (e.g., data hub servers associated with facilitating the ecommerce application).

As further shown in FIG. 4B, database portion 412 may include a set of database ("DB") servers 470 associated with providing information from one or more data structures for the ecommerce application or the like. In some implementations, the set of database servers 470 may include a group of SQL servers 472.

In some implementations, a server (e.g., a web server 450, an application server 460, a database server 470, or the like) may include one or more security functionalities, such as endpoint protection, antivirus protection, local firewalling, data loss prevention, file modification monitoring, or the like as a layer of security for the server. For example, Hybris server 464 may operate antivirus protection as an added layer of security to firewall device 440-2, firewall 406-2, or the like. In some implementations, the server may provide information identifying a detected malicious action (e.g., an attempted intrusion, a detected malicious file, etc.) for utilization in assessing a security situation.

As further shown in FIG. 4B, and by reference number 480, web portion 408 may receive a user request (e.g., from user device 370). Assume that the user request is for an order for food delivery. The user request is routed (e.g., from WAF portion 404) to customer portal server 456 based on address information (e.g., IP address information) indicating that the request is intended for customer portal server 456. Customer portal server 456 may generate an application request 485 for Hybris server 464. The application request is transmitted to Hybris server 464 (e.g., via firewall 406-2 and firewall device 440-2). Hybris server 464 may fulfill the request (e.g., by generating information for a store device of a store location that is intended to fulfill the order for food delivery). As shown by reference number 490, to fulfill the request, Hybris server 464 may generate a database request for information from SQL server 472. The database request is transmitted to SQL server 472 (e.g., via firewall 406-3 and firewall device 440-3), and SQL server 472 may provide database information associated with fulfilling the request (e.g., user identification information, payment information, preference information, or the like).

In this way, production virtual network 235 is configured with layered security to reduce a likelihood of a security situation causing a harm to production virtual network 235 relative to non-layered security. For example, user device 370 is not permitted to directly access web portion 408, rather WAF portion 404 establishes a reverse proxy connection to web portion 408 based on receiving traffic from user device 370. Similarly, WAF portion 404 may lack permission to access application portion 410, rather WAF portion 404 may transmit information to web portion 408, which may transmit information to application portion 410. Similarly, application portion 410 may request information from database portion 412 to fulfill a request provided by web portion 408, without web portion 408 having direct access to database portion 412.

Production virtual network 235 may utilize scalable computing resources to implement layered security. For example, a quantity of computing resources of production virtual network 235 (e.g., servers established for web portion 408, application portion 410, database portion 412, firewalls 406-1, 406-2, 406-3, and 406-4, or the like) may be scaled to meet demand, thereby facilitating comprehensive layered security with less resource allocation than may be required for a fixed allocation. In this way, cloud network 120 may reduce a likelihood of a security situation relative to another type of web platform using non-scalable computing resources that is, based on using non-scalable computing resources, unable to implement layered security as a result of excessive costs to establish fixed computing resources.

As indicated above, FIGS. 4A and 4B are provided merely as an example. Other examples are possible and may differ from what was described with regard to FIGS. 4A and 4B.

Figure 5A:
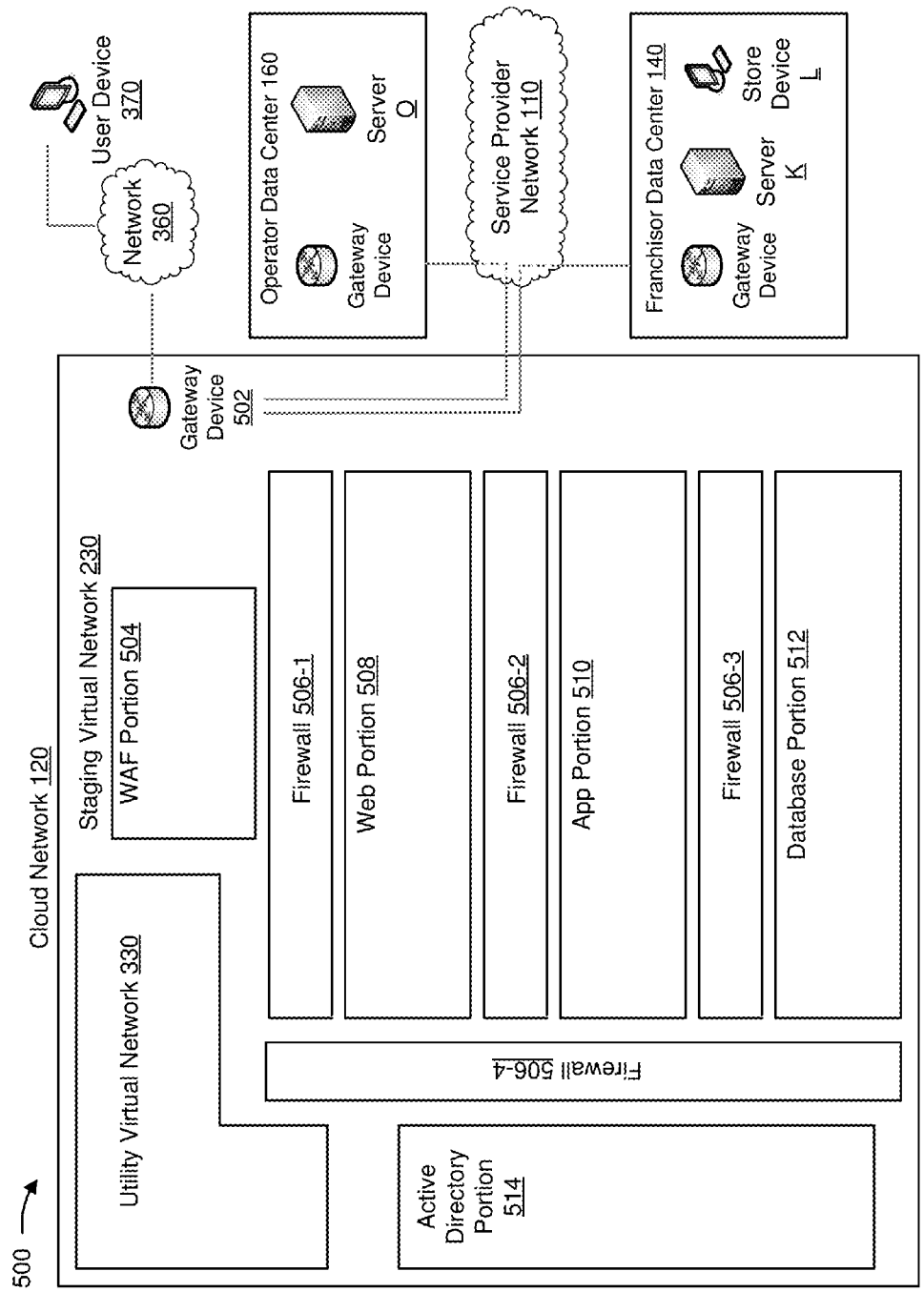
FIGS. 5A and 5B are diagrams of another example of a multi-layer security architecture with firewalled portions of a virtual network relating to the example environment shown in FIG. 1.
Figure 5B:
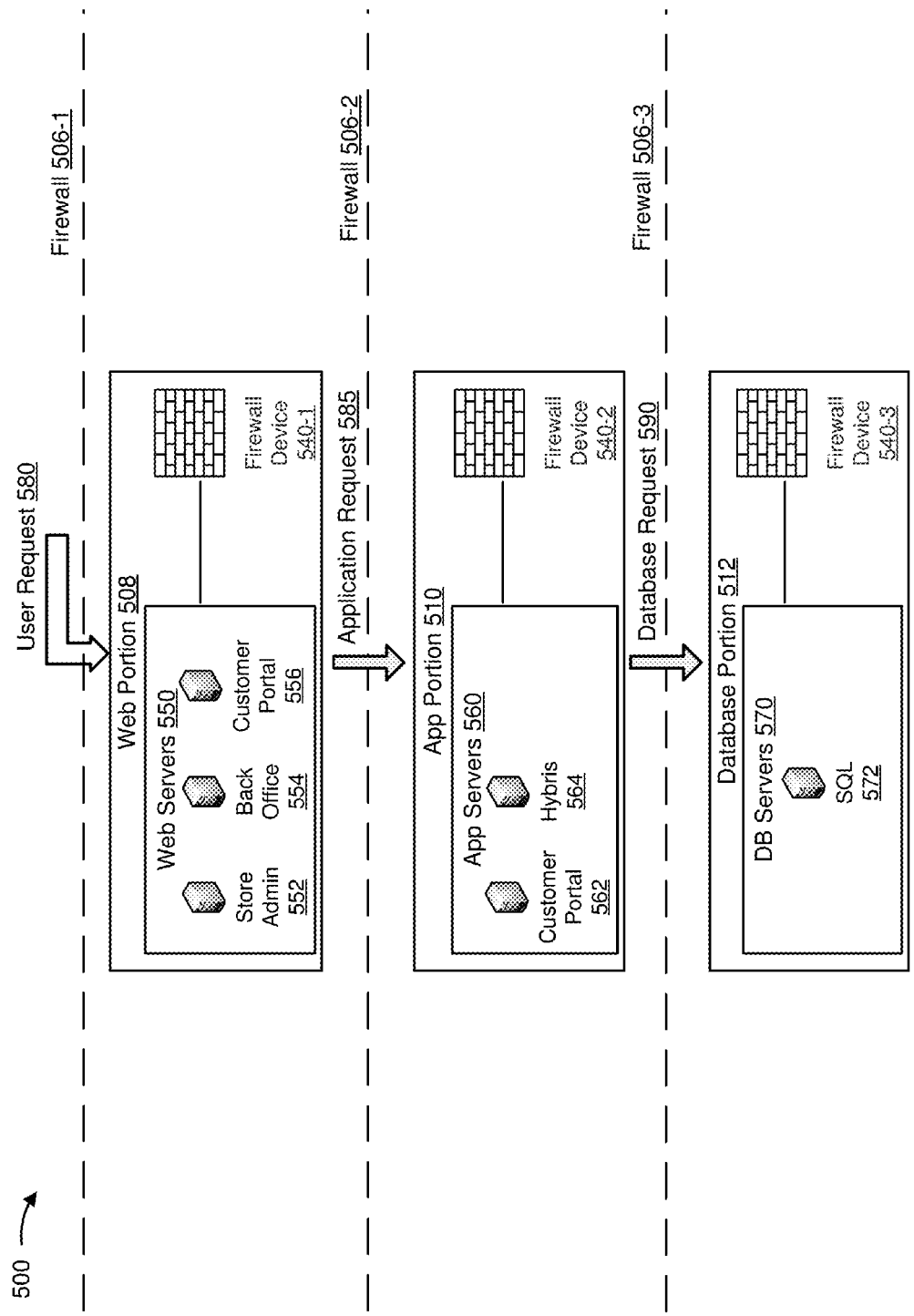

FIGS. 5A and 5B are diagrams of an example implementation 500 relating to example environment 100 shown in FIG. 1. FIGS. 5A and 5B show an example of a multi-layer security architecture with firewalled portions of a virtual network.

FIGS. 5A and 5B show an example of staging virtual network 230 of cloud network 120. As shown in FIGS. 5A and 5B, staging virtual network 230 is configured to correspond to and resemble production virtual network 235, thereby facilitating testing of an alteration to production virtual network 235 (e.g., a new feature, new program code, or the like) prior to implementation of the alteration in production virtual network 235. Staging virtual network 230 is configured with PCI compliance, thereby facilitating determination of whether the change operates as intended in a PCI compliant virtual network, such as production virtual network 235 (testing prior to that which is conducted in staging virtual network 230 may occur in a non-PCI compliant virtual network, such as development virtual network 215, QAT virtual network 220, E2E virtual network 225, or the like).

For example, and with regard to FIG. 5A, gateway device 502 may correspond to gateway device 402, and may perform one or more similar functions. Similarly, WAF portion 504 may correspond to WAF portion 404, and may perform one or more similar functions. Similarly, firewalls 506-1, 506-2, 506-3, and 506-4 may correspond to 406-1, 406-2, 406-3, and 406-4, respectively, and may, respectively, perform one or more similar functions. Similarly, web portion 508 may correspond to web portion 408, and may perform one or more similar functions. Similarly, application ("app") portion 510 may correspond to application portion 410, and may perform one or more similar functions. Similarly, database portion 512 may correspond to database portion 412, and may perform one or more similar functions. Similarly, active directory portion 514 may correspond to active directory portion 414, and may perform one or more similar functions.

As another example, and with regard to FIG. 5B, firewall devices 540-1, 540-2, and 540-3 may correspond to firewall devices 440-1, 440-2, and 440-3, respectively, and may, respectively, perform one or more similar functions. Similarly, web servers 550 (e.g., store administration ("admin") server 552, back office server 554, and customer portal server 556) may correspond to web servers 450 (e.g., store administration server 452, back office server 454, and customer portal server 456), and may perform one or more similar functions. Similarly, application ("app") servers 560 (e.g., customer portal server 562 and Hybris server 564) may correspond to application servers 460 (e.g., customer portal server 462 and Hybris server 464), and may perform one or more similar functions. Similarly, database servers 570 (e.g., SQL server 572) may correspond to database servers 470 (e.g., SQL server 472), and may perform one or more similar functions.

As another example, and with regard to FIG. 5B, web portion 508 may receive a user request 580 corresponding to user request 480, and may generate an application request 585 corresponding to application request 485. Similarly, application portion 510 may receive the application request 585 and may generate database request 590 corresponding to database request 490. Similarly, database portion 512 may receive database request 590 and may provide database information to fulfill database request 590.

As indicated above, FIGS. 5A and 5B are provided merely as an example. Other examples are possible and may differ from what was described with regard to FIGS. 5A and 5B.

Figure 6:
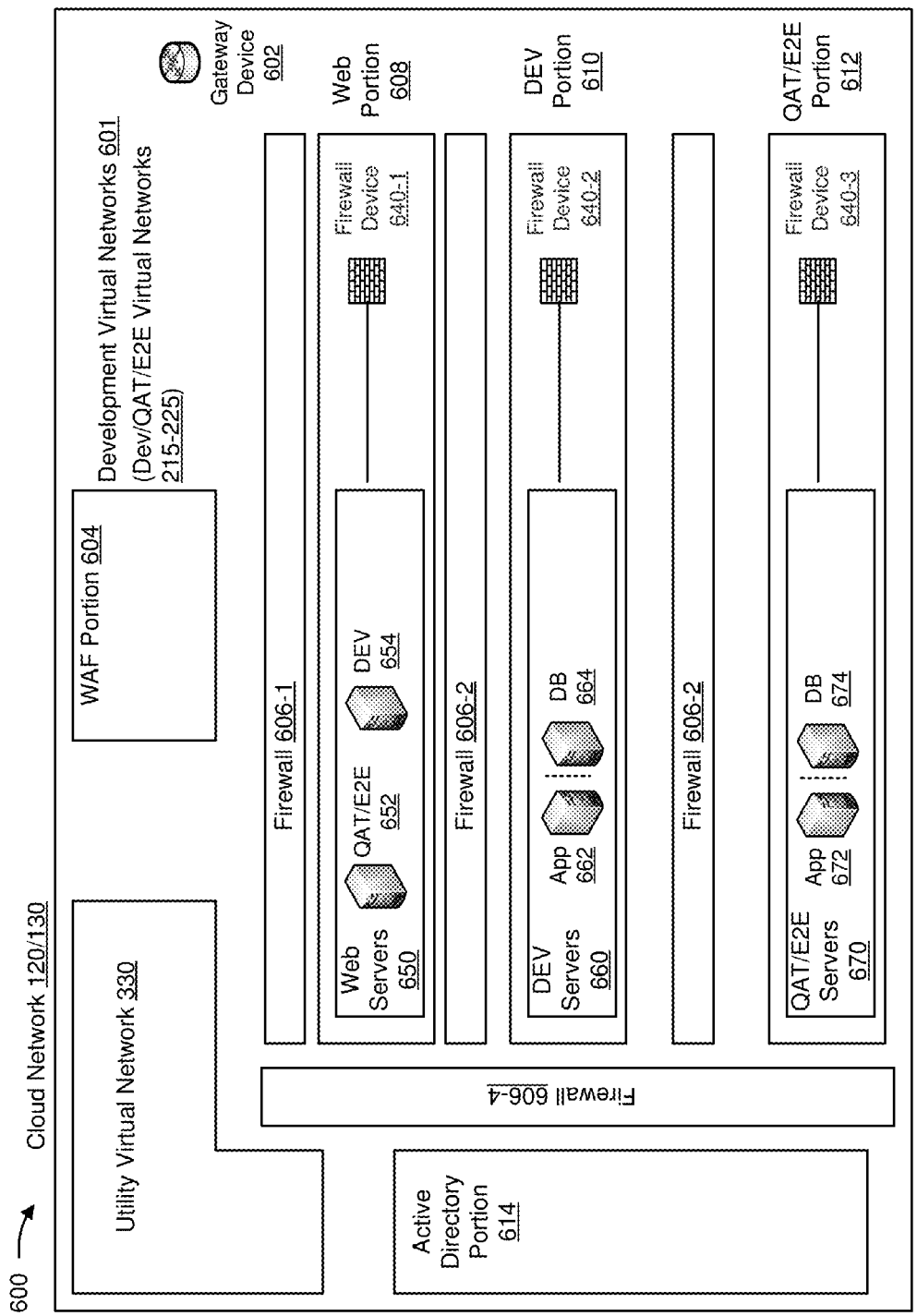
FIG. 6 is a diagram of yet another example of a multi-layer security architecture with firewalled portions of a virtual network.

FIG. 6 is a diagram of an example implementation 600 relating to example environment 100 shown in FIG. 1. FIG. 6 shows an example of a multi-layer security architecture with firewalled portions of a virtual network.

As shown in FIG. 6, cloud network 120 may include a development virtual network 215, a QAT virtual network 220, and/or an E2E virtual network 225, collectively referred to Development virtual networks 601. Development virtual networks 601 may include one or more portions and/or computing resources corresponding to production virtual network 235 of FIGS. 4A and 4B, staging virtual network 230 of FIGS. 5A and 5B, or the like. For example, development virtual networks 601 may include a gateway device 602, a WAF portion 604, a set of firewalls 606, a web portion 608, a development portion 610, a QAT/E2E portion 612, an active directory portion 614, a set of firewall devices 640, or the like.

WAF portion 604 may include one or more devices associated with providing firewalling for development virtual networks 601. For example, WAF portion 404 may include a virtual network (e.g., a sub-virtual network of production virtual network 235) that may receive network traffic from gateway device 402, and may apply a security filter, as described herein with regard to WAF 404 of FIGS. 4A and 4B.

Active directory portion 614 may refer to a portion of cloud network 120 associated with providing directory services, authentication, and/or authorization for users of cloud network 120 and development virtual networks 601. For example, cloud network 120 may allocate a quantity of computing resources to an active directory domain controller of active directory portion 614, as described herein with regard to active directory portion 414 of FIGS. 4A and 4B.

As further shown in FIG. 6, web portion 608 may include a firewall device 640-1 and a set of web servers 650 (e.g., a group of QAT/E2E servers 652, a group of development ("DEV") servers 654, or the like). Development portion 610 may include a firewall device 640-2 and a set of development servers 660 (e.g., a group of application servers 662, a group of database servers 664, or the like). In some implementations, application servers 662 may be incorporated into an application server virtual network and database servers 664 may be incorporated into a database virtual network, each of which are sub-virtual networks of development portion 610. QAT/E2E portion 612 may include a firewall device 640-3 and a set of QAT/E2E servers 670 (e.g., a group of application servers 672, a group of database servers 674, or the like). In some implementations, application servers 672 may be incorporated into an application server virtual network and database servers 674 may be incorporated into a database virtual network, each of which are sub-virtual networks of QAT/E2E portion 618. In some implementations, QAT/E2E portion 612 may include a QAT sub-portion that includes a set of application servers 672, a set of database servers 674, or the like and an E2E sub-portion that includes a set of application servers 672, a set of database servers 674, or the like.

As indicated above, FIG. 6 is provided merely as an example. Other examples are possible and may differ from what was described with regard to FIG. 6.

Figure 7:
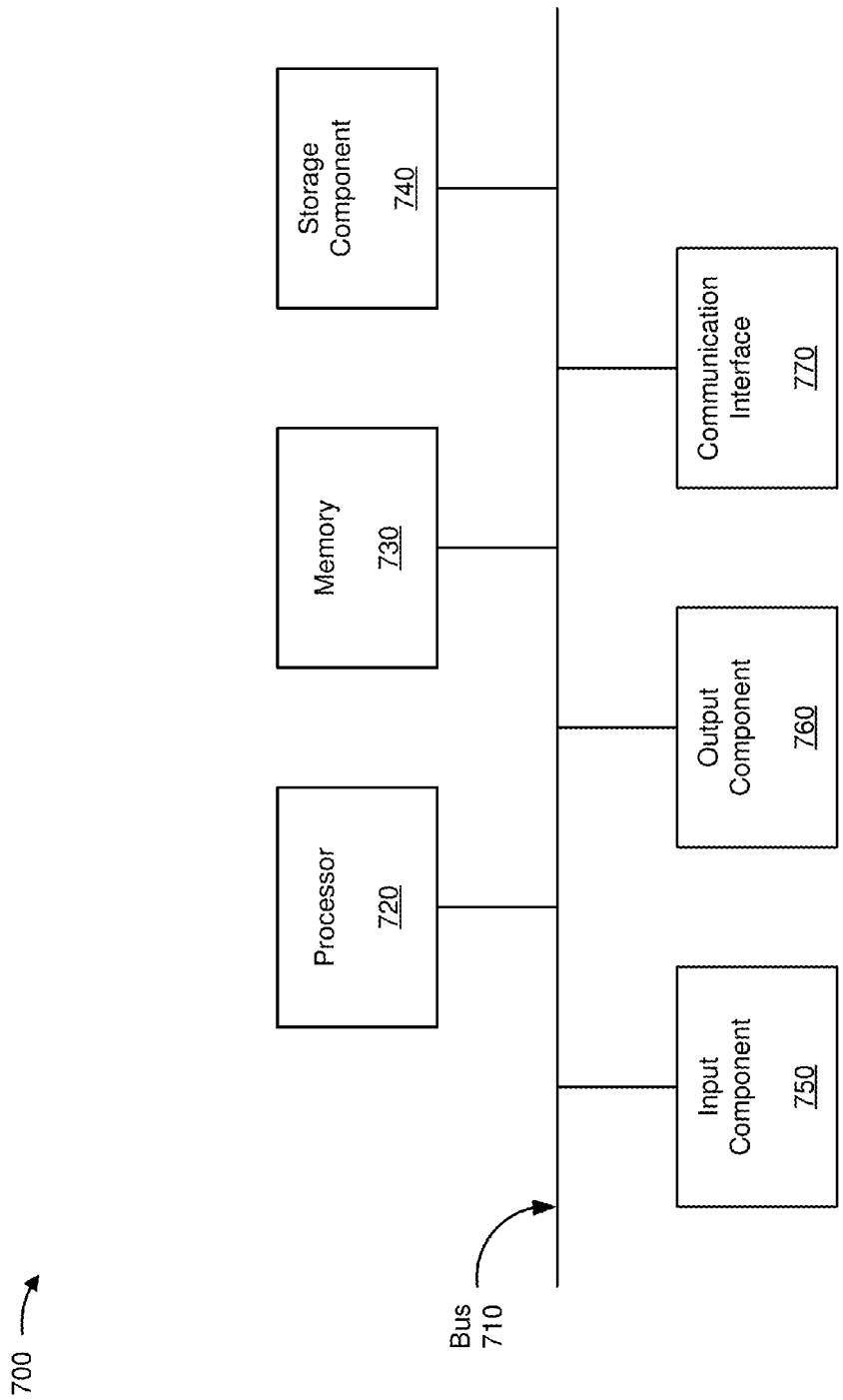
FIG. 7 is a diagram of example components of one or more devices and/or computing resources described herein.

FIG. 7 is a diagram of example components of a device 700. Device 700 may correspond to one or more devices and/or computing resources described herein (e.g., a device and/or a computing resource of FIGS. 1-6, FIGS. 8-10, or the like). In some implementations, one or more devices and/or computing resources described herein may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 may include a component that permits communication among the components of device 700. Processor 720 is implemented in hardware, firmware, or a combination of hardware and software. Processor 720 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 730 may include random access memory (RAM), a read only memory (ROM), and/or another type of dynamic or static storage device (e.g., a flash memory, a magnetic memory, an optical memory, etc.) that stores information and or instructions for use by processor 720.

Storage component 740 may store information and/or software related to the operation and use of device 700. For example, storage component 740 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 750 may include a component that permits device 700 to receive information, such as via user input (e.g., a touch screen display, a keyboard, a keypad, a mouse, a button, a switch, a microphone, etc.). Additionally, or alternatively, input component 750 may include a sensor for sensing information (e.g., a global positioning system (GPS) component, an accelerometer, a gyroscope, an actuator, etc.). Output component 760 may include a component that provides output information from device 700 (e.g., a display, a speaker, one or more light-emitting diodes (LEDs), etc.).

Communication interface 770 may include a transceiver-like component (e.g., a transceiver, a separate receiver and transmitter, etc.) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes in response to processor 720 executing software instructions stored by a computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
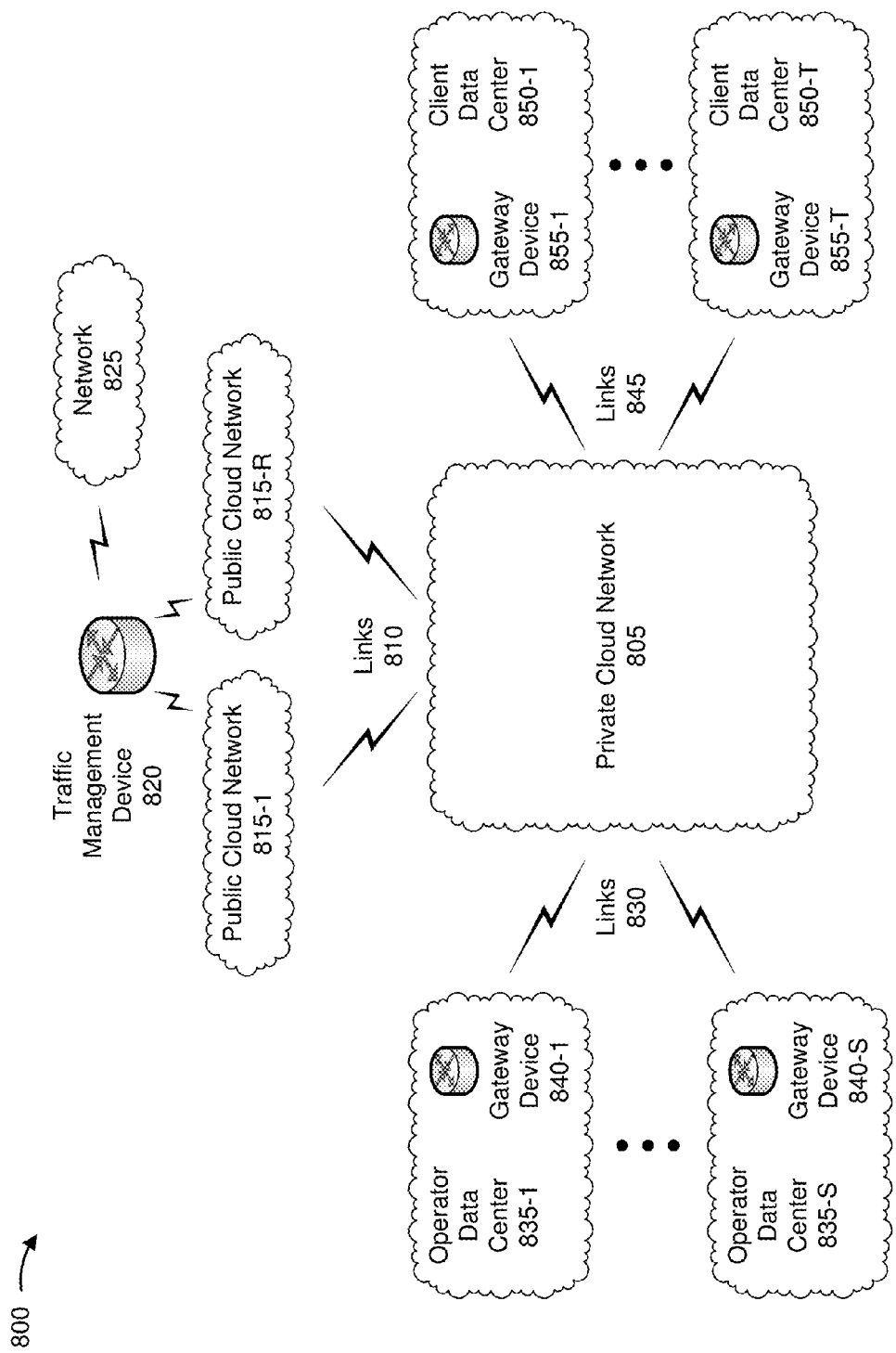
FIG. 8 is a diagram of a hub-and-spoke connection configuration relating to a cloud network shown in FIG. 1.

FIG. 8 is a diagram of an example implementation 800 relating to example environment 100 shown in FIG. 1. FIG. 8 shows an example of a hub-and-spoke connection configuration. A spoke may refer to a portion of example implementation 800, such as a particular data center (e.g., a particular operator data center 835, a particular client data center 850, etc.), a particular public cloud network 815, or the like. A hub may refer to another portion of example implementation 800, such as private cloud network 805.

As shown in FIG. 8, example implementation 800 may include a private cloud network 805, a set of links 810, one or more public cloud networks 815-1 through 815-R (hereinafter referred to collectively as "public cloud networks 815," and individually as "public cloud network 815"), a traffic management device 820, a network 825, a set of links 830, one or more operator data centers 835-1 through 835-S (hereinafter referred to collectively as "operator data centers 835," and individually as "operator data center 835"), which may include a group of gateway devices 840-1 through 840-S (hereinafter referred to collectively as "gateway devices 840," and individually as "gateway device 840"), a set of links 845, and one or more client data centers 850-1 through 850-T (hereinafter referred to collectively as "client data centers 850," and individually as "client data center 850"), which may include a group of gateway devices 855-1 through 855-T (hereinafter referred to collectively as "gateway devices 855," and individually as "gateway device 855").

Private cloud network 805 may include one or more wired and/or wireless networks. In some implementations, private cloud network 805 may correspond to service provider network 110 shown in FIG. 1. In some implementations, private cloud network 805 may include a set of network devices (e.g., a gateway device, an edge device, a provider edge router, a route reflector, etc.), a set of links, or the like. For example, private cloud network 805 may include a provider edge router that receives payload data from a customer edge router (e.g., gateway device 840, gateway device 855, etc.), and routes the payload data to public cloud network 815 via link 810. In some implementations, private cloud network 805 may receive configuration information from operator data center 835. For example, gateway device 840 of operator data center 835 may propagate a BGP extended community message identifying one or more routes for routing payload data. In this case, private cloud network 805 may route received payload data based on the one or more routes. In some implementations, private cloud network 805 may include a mesh architecture. For example, private cloud network 805 may configure a set of network devices and a set of links to provide redundant networking routes, which may permit private cloud network 805 to perform routing of information from/to public cloud network 815 to/from operator data center 835, client data center 850, or the like.

Link 810 may connect private cloud network 805 and public cloud network 815. For example, link 810 may include a single-hop connection, such as an Azure Express-Route connection, an Amazon AWS Direct Connect connection, or the like. In some implementations, link 810 may include a direct, private connection (e.g., a connection that does not utilize the public Internet), thereby improving bandwidth, reliability, security, or the like relative to utilizing a public Internet connection for routing.

Public cloud network 815 may include a cloud-based computing platform providing one or more computing resources, such as a Microsoft Azure cloud, an Amazon AWS cloud, or the like. In some implementations, public cloud network 815 may correspond to cloud network 120 shown in FIG. 1, cloud network 130 shown in FIG. 1, or the like. In some implementations, public cloud network 815 may utilize traffic management device 820 (e.g., an Azure traffic manager, an Amazon AWS elastic load balancer, or the like) to perform traffic management services (e.g., load balancing, redundancy routing, etc.) for public cloud network 815. For example, traffic management device 820 may receive, from a user device, a request for information associated with a set of public cloud networks 815, and traffic management device 820 may select a particular public cloud network 815 for receiving the request. In this case, the user device may connect to the particular public cloud network 815 via network 825 (e.g., the public Internet or another network).

Link 830 may connect operator data center 835 (e.g., gateway device 840) to private cloud network 805. For example, operator data center 835 may transmit information via link 830 to private cloud network 805 for routing. In some implementations, multiple links 830 may be associated with multiple telecommunications providers. For example, a first link 830 may be established with a first telecommunications provider to connect a first operator data center 835 to private cloud network 805 and a second link 830 may be established with a second telecommunications provider to connect a second operator data center 835 to private cloud network 805. In contrast, private cloud network 805 may connect to one or more public cloud networks 815 via one or more links 810, each provided by the same telecommunications provider. In other words, a first link 810 may not be provided by a different telecommunications provider than a second link 810, in some implementations. In this way, flexibility is permitted for selecting a first mile connectivity provider for operator data center 835 to private cloud network 805 and security and performance is maintained for last mile connectivity of private cloud network 805 to public cloud network 815.

Operator data center 835 may include one or more data centers associated with an operator of public cloud network 815. In some implementations, operator data center 835 may correspond to operator data center 160 shown in FIG. 1. For example, a first entity (e.g., an operator) may request that a second entity (e.g., a public cloud provider) provide access to computing resources designated as public cloud network 815, and operator data center 835 may operate and/or control the computing resources. In this case, operator data center 835 may be utilized for promoting program code that is executed by the computing resources; providing support services, such as maintaining functionality of the computing resources, performing analytics on operation of the computing resources, etc.; providing a call center for support of a web platform associated with public cloud network 815; or the like.

Further to the example, the operator may request that a third entity (e.g., a private cloud provider) provide access to routing resources designated as private cloud network 805, and operator data center 835 may be utilized to operate, control, and/or configure the routing resources, such as by designating locations at which to install gateway devices 840 and/or 855, connecting to gateway devices to cause BGP extended community messages to be propagated to configure routing, or the like. In this way, operator data center 835 is utilized to operate public cloud network 815 for a client, rather than the client being required to operate public cloud network 815 directly.

Based on centralizing operation of one or more public cloud networks 815 for one or more clients with operator data center 835, the one or more clients may reduce a quantity of computing resources (e.g., processing resources, memory resources, networking resources, etc.) allocated to a corresponding one or more client data centers 850 relative to each client operating a corresponding public cloud network 815. Moreover, when a client is associated with multiple client data centers 850 (e.g., multiple data centers associated with multiple different locations, multiple different subsidiaries, etc.), operator data center 835 may control private cloud network 805 and public cloud network 815 for the client, thereby improving security and reliability and reducing a likelihood of errors relative to each client data center 850 being authorized to control public cloud network 815.

In some implementations, operator data center 835 may include an analytics device (e.g., a server) that may receive information identifying a set of metrics associated with the web-platform of public cloud network 815, and may perform analytics on the set of metrics. For example, the analytics device may perform one or more analytics techniques, such as an optimization technique, a statistical measurement technique, or the like, and may generate analytics information for display via a user interface. Additionally, or alternatively, operator data center 835 may cause an alteration to public cloud network 815 based on results of the one or more analytics techniques, or the like.

Gateway device 840 may include one or more devices associated with routing information from/to operator data center 835. In some implementations, gateway device 840 may correspond to one or more gateway devices shown in FIG. 1. In some implementations, gateway device 840 may include a customer edge router. For example, operator data center 835 may include a group of gateway devices 840 that may communicate with one or more provider edge routers of private cloud network 805. In some implementations, gateway device 840 may propagate routing and/or configuration information. For example, gateway device 840 may transmit a BGP extended community message (e.g., based on receiving an instruction from a device of operator data center 835) to configure one or more other gateway devices, such as gateway devices of private cloud network 805 (e.g., causing gateway devices of private cloud network 805 to be configured as BGP peers of gateway device 840) or the like. In this case, operator data center 835 may transmit configuration information to gateway devices 835, 855, or the like, but may be prevented from causing gateway device 835 to transmit payload data to and/or receiving payload data from gateway device 855.

In this way, gateway device 840 and private cloud network 805 may reduce a likelihood that an error with a particular spoke of a hub-and-spoke configuration (e.g., operator data center 835, client data center 850, etc.), causes an outage with another spoke relative to permitting inter-spoke transmission of payload data. Moreover, based on configuring routing using configuration information caused to be transmitted by a single, designated spoke (e.g., operator data center 835), rather than being caused to be transmitted by a device of any spoke, the hub-and-spoke connection configuration may include one or more security techniques assigned to protect the single, designated spoke rather than all spokes. In this way, the hub-and-spoke connection configuration reduces utilization of computing resources associated with the one or more security techniques and reduces a likelihood that a maliciously injected or erroneous route is propagated from a particular gateway device 855 to other gateway devices 855 or gateway device 840, which reduces a likelihood and/or a severity of an outage.

Link 845 may connect client data center 850 (e.g., gateway device 855) to private cloud network 805 (e.g., a gateway device of private cloud network 805). For example, client data center 850 may transmit information via link 845 to private cloud network 805 for routing. In some implementations, link 845 may correspond to link 830.

Client data center 850 may include one or more data centers associated with a client of an operator of operator data center 835. For example, client data center 850 may utilize an ecommerce web platform associated with public cloud network 815, such as for food delivery of food based on a product order or the like, and may designate the operator for operating the web platform associated with public cloud network 815. In some implementations, client data center 850 may correspond to franchisor data center 140 shown in FIG. 1, franchisee data center 150 shown in FIG. 1, or the like.

In some implementations, client data center 850 may provide information to public cloud network 815 to alter the web platform. For example, based on routing information received from operator data center 835 (e.g., via private cloud network 805), client data center 850 may transmit information to and/or receive information from public cloud network 815. In some implementations, client data center 850 may perform analytics on the web platform based on information received from public cloud network 815. In some implementations, client data center 850 may connect to one or more store locations for the web platform. For example, client data center 850 may connect to a store location, and may receive information from the store location, and route the information to public cloud network 815 (e.g., via gateway device 855 and private cloud network 805). Similarly, client data center 850 may receive information from public cloud network 815 (e.g., via private cloud network 805), and may direct the information to the store location.

Gateway device 855 may include one or more devices associated with routing information from/to client data center 850. For example, gateway device 855 may correspond to one or more gateway devices shown in FIG. 1. In some implementations, gateway device 855 may receive configuration information from gateway device 840. For example, gateway device 855 may receive, from operator data center 835, a trigger to transmit a BGP extended community message indicating an alteration to routing for gateway device 855 (e.g., a parameter alteration, a route alteration, etc.). Additionally, or alternatively, gateway device 855 may receive a trigger to alter the configuration of gateway device 855. In this way, the client can route information to/from private cloud network 805 based on the operator controlling private cloud network 805 and routing associated therewith. In some implementations, gateway device 855 may utilize an authentication procedure to permit a connection to gateway device 855 to transmit configuration information. For example, when a device attempts to connect to gateway device 855, gateway device 855 may require a multi-factor authentication procedure to connect to gateway device 855. In this case, a device from operator data center 835 may provide information associated with completing the multi-factor authentication procedure and may be connected (e.g., via a static connection of private cloud network 805) to gateway device 855 to cause gateway device 855 to propagate a route.

As indicated above, FIG. 8 is provided merely as an example. Other examples are possible and may differ from what was described with regard to FIG. 8.

Figure 9:
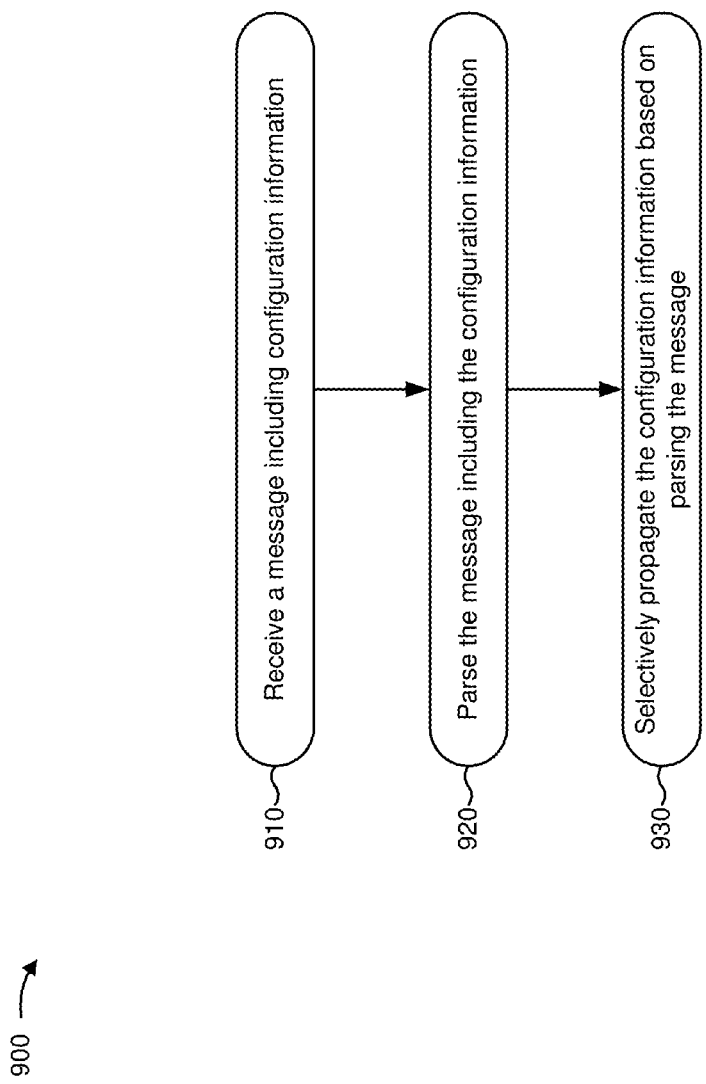
FIG. 9 is a flow chart of an example process for routing configuration information in a hub-and-spoke connection configuration.

FIG. 9 is a flow chart of an example process 900 for routing configuration information in a hub-and-spoke connection configuration. In some implementations, one or more process blocks of FIG. 9 may be performed by private cloud network 805. In some implementations, one or more process blocks of FIG. 9 may be performed by another device or a group of devices separate from or including private cloud network 805, such as one or more other devices and/or computing resources described herein (e.g., a device and/or a computing resource of FIGS. 1-8).

As shown in FIG. 9, process 900 may include receiving a message including configuration information (block 910). For example, private cloud network 805 may receive the message including the configuration information. In some implementations, private cloud network 805 may receive a BGP message, such as a BGP extended community message. For example, operator data center 835 may determine that a route is to be altered to add a new client data center 850 as a new spoke of a hub-and-spoke connection configuration associated with private cloud network 805, and may determine to cause gateway device 840 to propagate the BGP extended community message to identify one or more routes associated with routing payload data to public cloud network 815. Similarly, operator data center 835 may determine to cause gateway device 855 to propagate a BGP extended community message. In some implementations, the message may include configuration information associated with routing data. For example, private cloud network 805 may receive a BGP message identifying a set of network devices for routing payload data from a source network device to a target network device. Additionally, or alternatively, private cloud network 805 may receive a message including configuration information identifying network reachability information, configuration information associated with determining whether a link is available (e.g., a BGP Keepalive message), configuration information associated with identifying an error, or the like.

In some implementations, the message may be received via an authenticated connection. For example, gateway device 840, gateway device 855, a gateway device of private cloud network 805, or the like may require authentication information to permit a connection to a device of operator data center 835 to permit the device of operator data center 835 to transmit a message including the configuration information.

As further shown in FIG. 9, process 900 may include parsing the message including the configuration information (block 920). For example, private cloud network 805 may parse the message that includes the configuration information. In some implementations, private cloud network 805 may parse the message to determine a destination device for the message. For example, private cloud network 805 (e.g., a provider edge router) may determine that private cloud network 805 is the destination for the message (e.g., the same provider edge router, another provider edge router, another device, etc.).

In some implementations, private cloud network 805 may parse the message to determine a source device for the configuration data. For example, private cloud network 805 may determine that the message is transmitted from gateway device 840. In this case, private cloud network 805 may determine that the message is to be propagated based on gateway device 840 being associated with operator data center 835, which operates private cloud network 805 and is permitted to configure gateway devices associated with private cloud network 805 (e.g., gateway devices of private cloud network 805, gateway devices 840, gateway devices 855, etc.). In contrast, private cloud network 805 may determine that the message is transmitted from gateway device 855. In this case, private cloud network 805 may determine that the message is not to be propagated based on gateway device 855 being associated with client data center 850, which is not operating private cloud network 805.

In this way, private cloud network 805 improves network security and reduces an impact of network issues relative to permitting configuration data to be provided from any gateway device to any other gateway device. For example, private cloud network 805 reduces a likelihood that a malicious route can be injected at gateway device 855 and propagated to other gateway devices of the hub-and-spoke connection configuration. Moreover, based on limiting configuration data propagation to gateway devices 840 of operator data center 835, private cloud network 805 may reduce a quantity of resources dedicated to network security by permitting a concentration of security resources at one or more operator data centers 835 rather than at both the one or more operator data centers 835 and one or more client data centers 850.

In some implementations, private cloud network 805 may alter a configuration based on parsing the message. For example, a provider edge router of private cloud network 805 may receive the message, parse the message to identify route information included in the message, and may store the route information to permit routing based on the route information. In this way, private cloud network 805 alters a configuration based on information provided by operator data center 835.

In some implementations, another device may parse the message including the configuration information. For example, gateway device 840 or gateway device 855 may parse the message and determine that the message is associated with triggering gateway device 840 or gateway device 855 to transmit a BGP message associated with propagating a route for a respective data center. In this way, a user utilizing a device of operator data center 835 can transmit information to a gateway device to cause the gateway device to propagate a route, thereby permitting control of routing of payload data (e.g., via private network 805) by a user of operator data center 835.

As further shown in FIG. 9, process 900 may include selectively propagating the configuration information based on parsing the message (block 930). For example, private cloud network 805 may selectively propagate the configuration information. In some implementations, private cloud network 805 may transmit the configuration data to a destination device to cause the destination device to alter a configuration. For example, private cloud network 805 may direct the configuration information to gateway device 855 of client data center 850 to cause gateway device 855 to store route information, propagate a BGP message including route information, or the like. In this way, private cloud network 805 permits gateway device 855 to route payload data to/from public cloud network 815 based on the stored route information. Additionally, or alternatively, private cloud network 805 may reject propagation of the message (e.g., based on the message being transmitted from client data center 850 rather than operator data center 835). In this way, private cloud network 805 permits an operator to configure routing for a client.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
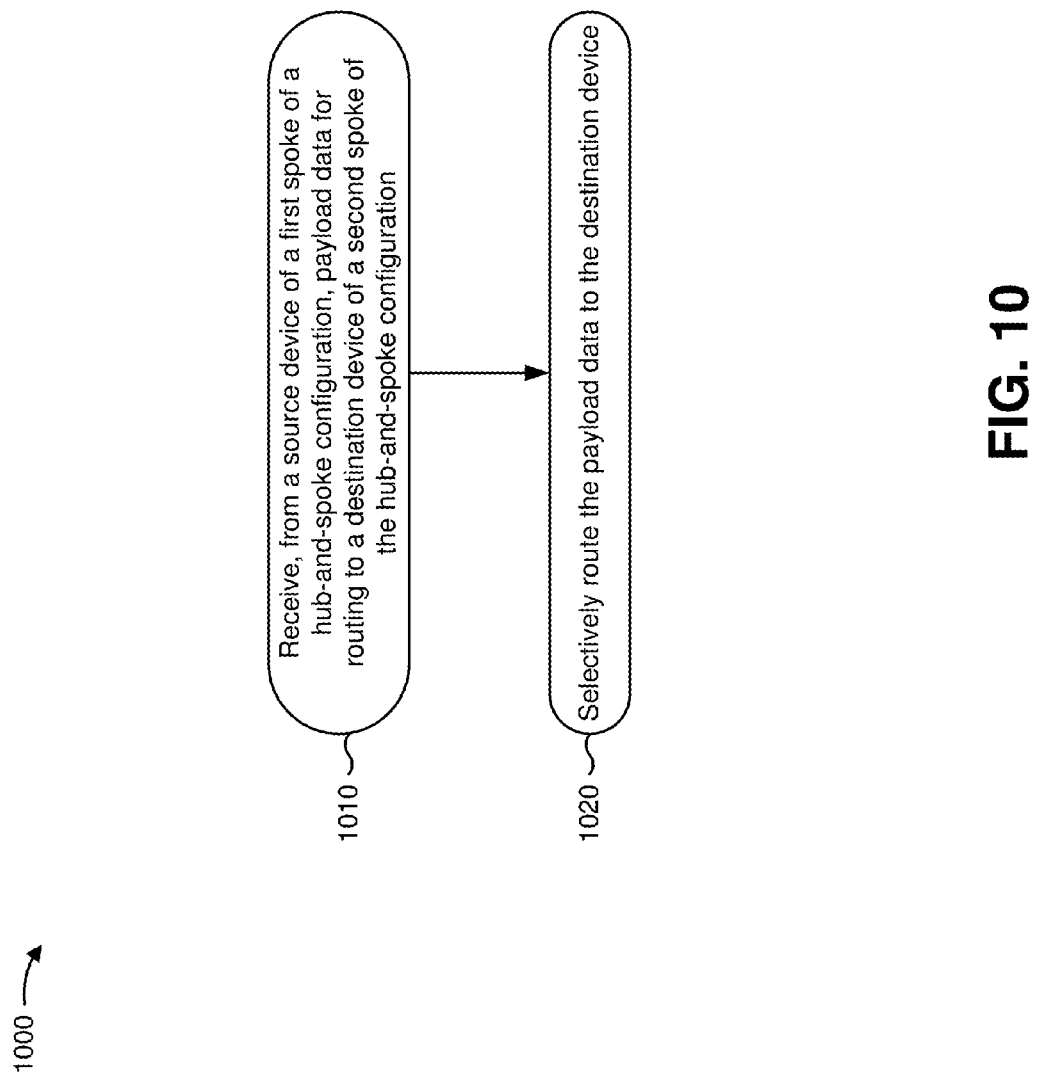
FIG. 10 is a flow chart of an example process for routing payload data in a hub-and-spoke connection configuration.

FIG. 10 is a flow chart of an example process 1000 for routing payload data in a hub-and-spoke connection configuration. In some implementations, one or more process blocks of FIG. 10 may be performed by private cloud network 805. In some implementations, one or more process blocks of FIG. 10 may be performed by another device or a group of devices separate from or including the routing device, such as one or more other devices and/or computing resources described herein (e.g., a device and/or a computing resource of FIGS. 1-8).

As shown in FIG. 10, process 1000 may include receiving, from a source device of a first spoke of a hub-and-spoke connection configuration, payload data for routing to a destination device of a second spoke of the hub-and-spoke connection configuration (block 1010). For example, private cloud network 805 may receive, from the source device of the first spoke of the hub-and-spoke connection configuration, payload data for routing to the destination device of the second spoke of the hub-and-spoke connection configuration.

The payload data may refer to data not associated with configuring routing for private cloud network 805 or the like. For example, the payload data may include program code for testing via public cloud network 815, instructions associated with operating public cloud network 815 (e.g., instructions relating to obtaining data for performing analytics, determining whether devices associated with a store location are communicating with public cloud network 815, performing traffic management for public cloud network 815, managing security operations for public cloud network 815, etc.), or the like. Additionally, or alternatively, the payload data may include information associated with altering a set of store properties associated with a store location (e.g., a store address, an inventory, etc.), responding to a location query (e.g., responding to a user requesting, via the web platform of public cloud network 815, information identifying a store location within a particular proximity of the user), or the like. Additionally, or alternatively, the payload data may include information identifying an order, a confirmation of payment information being processed, or the like.

In some implementations, private cloud network 805 may receive the payload data from operator data center 835. For example, gateway device 840 may route, to private cloud network 805, payload data associated with altering functionality of the web platform of public cloud network 815. Additionally, or alternatively, private cloud network 805 may receive the payload data from client data center 850. For example, gateway device 855 may route, to private cloud network 805, payload data associated with causing a set of orders for food delivery from a first store location to be routed by the web platform to an overflow queue associated with a second store location. In some implementations, private cloud network 805 may receive the payload data from public cloud network 815. For example, public cloud network 815 may transmit, to private cloud network 805, encrypted order information (e.g., a product order) relating to an order for food delivery via a web platform.

As further shown in FIG. 10, process 1000 may include selectively routing the payload data to the destination device (block 1020). For example, private cloud network 805 may selectively route the payload data to the destination device. In some implementations, private cloud network 805 may reject routing the payload data to the destination device. For example, when the payload data is associated with an invalid route, such as transmitting data from operator data center 835 to client data center 850, from client data center 850 to operator data center 835, or the like, private cloud network 805 may reject the routing based on invalid route information. Additionally, or alternatively, gateway device 840 or gateway device 855 may reject the routing based on the invalid route information. In this way, private cloud network 805 (and/or gateway device 840 or gateway device 855) reduces a likelihood of a security issue propagating relative to each spoke being permitted to transmit data to each other spoke.

In some implementations, private cloud network 805 may route the payload data to the destination device. For example, private cloud network 805 may permit the payload data to be routed from public cloud network 815 to operator data center 835 or client data center 850. Similarly, private cloud network 805 may permit the payload data to be routed from operator data center 835 or client data center 850 to public cloud network 815. In this way, private cloud network 805 permits devices to communicate with public cloud network 815 and/or the web platform provided by public cloud network 815.

In some implementations, private cloud network 805 may meter network traffic associated with the payload data when selectively routing the payload data. For example, private cloud network 805 may determine and/or provide information associated with determining a network traffic usage associated with each spoke, each gateway device of each spoke, each server device of each spoke, or the like. In some implementations, private cloud network 805 may cause bandwidth to be allocated based on metering the network traffic. For example, private cloud network 805 may provide information associated with metering the traffic to operator data center 835, and operator data center 835 may transmit configuration information associated with allocating a network resource, such as bandwidth or the like, based on the information associated with metering traffic. In this way, private cloud network 805 may improve network performance by permitting bandwidth to be allocated on an as needed basis rather than in a fixed configuration. Additionally, or alternatively, operator data center 835 may automatically generate information associated with billing one or more entities for bandwidth utilization based on metering network traffic. For example, operator data center 835 may cause a set of entities associated with a set of client data centers 850 (e.g., franchisees) to each be charged by another entity (e.g., a franchisor) for network traffic. In this way, private cloud network 805 may cause the set of client data centers 850 to reduce network traffic, thereby reducing a corresponding cost and improving network performance relative to each franchisee being provided with unmetered access to bandwidth.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    a private cloud network,
        the private cloud network being operated by an operator for a client,
        the private cloud network being connected to a public cloud network that operates a web platform,
            the public cloud network including a set of virtual networks, the set of virtual networks including:
                a first virtual network that includes a group of development servers for developing a development update relating to the system, a second virtual network that includes a group of quality assurance and testing servers for performing quality assurance and testing on the development update after developing the development update,
                a third virtual network that includes a group of end-to-end testing servers for performing end-to-end testing on the development update after performing quality assurance and testing,
                a fourth virtual network that includes a group of staging servers for performing pre-production staging of the development update after performing end-to-end testing on the development update, and
                a fifth virtual network that includes a group of production servers for implementing the development update after performing pre-production staging of the development update, the set of virtual networks being connected in a hub-and-spoke configuration,
        the private cloud network being connected to a plurality of groups of gateway devices,
            a first group of gateway devices, of the plurality of groups of gateway devices, being located at an operator data center associated with the operator,
            the first group of gateway devices providing connectivity for the operator data center to connect to the public cloud network via the private cloud network, and
            the operator data center being utilized to operate the public cloud network for the client,
            a second group of gateway devices, of the plurality of groups of gateway devices, being located at a client data center associated with the client,
            the second group of gateway devices providing connectivity for the client data center to connect to the public cloud network via the private cloud network, and
            the client data center utilizing the web platform and designating the operator for operating the web platform with the public cloud network, and
            the private cloud network being connected to the public cloud network, the operator data center, and the client data center in a hub and spoke connection configuration.

2. The system of claim 1, where the private cloud network includes one or more devices of a multiprotocol label switching (MPLS) virtual private network (VPN).

3. The system of claim 1, where the development update is a first development update; and
    where the private cloud network further comprises:
        another group of gateway devices to:
            receive a second development update from the first group of gateway devices; and
            route the second development update to a server associated with the public cloud network to cause the second development update to be tested or implemented,
            the other group of gateway devices being connected to the first group of gateway devices.

4. The system of claim 1, where the private cloud network is connected to the public cloud network via single-hop connection.

5. The system of claim 1, where the private cloud network connects to a first particular gateway device, of the plurality of groups of gateway devices, via a first telecommunications provider and a second particular gateway device, of the plurality of groups of gateway devices, via a second telecommunications provider,
    the first telecommunications provider being different from the second telecommunications provider.

6. The system of claim 1, where the private cloud network includes a particular gateway device,
   the particular gateway device being associated with receiving routing configuration information from a device of the operator data center and routing the configuration information to one of the second group of gateway devices to cause the one of the second group of gateway devices to propagate a border gateway protocol (BGP) message.

7. The system of claim 1, where the private cloud network includes a particular gateway device,
   the particular gateway device being associated with routing payload data between the public cloud network and the first group of gateway devices or the second group of gateway devices, and
   the particular gateway device not being associated with routing payload data between the first group of gateway devices and the second group of gateway devices.

8. A method, comprising:
   receiving, by a device, configuration information associated with configuring routing for a system,
      the system including a public cloud network, a private cloud network, an operator data center, and a client data center,
         the public cloud network being associated with operating a web platform,
         the public cloud network including a set of virtual networks, the set of virtual networks including:
            a first virtual network that includes a group of development servers for developing a development update relating to the system,
            a second virtual network that includes a group of quality assurance and testing servers for performing quality assurance and testing on the development update after developing the development update,
            a third virtual network that includes a group of end-to-end testing servers for performing end-to-end testing on the development update after performing quality assurance and testing;
            a fourth virtual network that includes a group of staging servers for performing pre-production staging of the development update after performing end-to-end testing on the development update; and
            a fifth virtual network that includes a group of production servers for implementing the development update after performing pre-production staging of the development update,
            the set of virtual networks being connected in a hub-and-spoke configuration,
         the private cloud network being connected to a plurality of groups of gateway devices,
            a first group of gateway devices, of the plurality of groups of gateway devices, being located at the operator data center,
               the first group of gateway devices providing connectivity for the operator data center to connect to the public cloud network via the private cloud network, and
               the operator data center being utilized to operate the public cloud network for a client;
            a second group of gateway devices, of the plurality of groups of gateway devices, being located at the client data center,
               the second group of gateway devices providing connectivity for the client data center to connect to the public cloud network via the private cloud network, and
               the client data center utilizing the web platform and designating an operator for operating the web platform with the public cloud network, and
         the system being configured in a hub-and-spoke connection configuration;
   selectively propagating, by the device, the configuration information associated with configuring routing for the system,
      the configuration information including one or more routes for routing information from or to the public cloud network;
   receiving, by the device, payload data for routing from a first spoke of the hub-and-spoke connection configuration to a second spoke of the hub-and-spoke connection configuration, after selectively propagating the configuration information; and
   selectively routing, by the device, the payload data to the second spoke of the hub-and-spoke connection configuration.

9. The method of claim 8, where receiving the configuration information, comprises:
   receiving the configuration information from a device of the operator data center, the operator data center being authorized to configure routing for the system; and
   where selectively propagating the configuration information comprises:
      selectively propagating, based on receiving the configuration information, the configuration information to a gateway device of the public cloud network, the private cloud network, or the client data center to cause the gateway device to propagate a route for routing payload data.

10. The method of claim 8, where receiving the configuration information, comprises:
    receiving a trigger to transmit a border gateway protocol (BGP) message advertising a route for payload data; and
    where selectively propagating the configuration information comprises:
       propagating the BGP message.

11. The method of claim 8, where receiving the configuration information comprises:
    receiving configuration information associated with identifying one or more routes for routing network traffic between a franchisee data center and the public cloud network; and
    where selectively propagating the configuration information comprises:
       propagating the configuration information to at least one of:
          a gateway device of the franchisee data center, or
          a gateway device of the private cloud network.

12. The method of claim 8, where the configuration information is included in a community message.

13. The method of claim 8, further comprising:
    failing to route the payload data when neither the first spoke nor the second spoke is the public cloud network.

14. The method of claim 8, further comprising:
    providing, based on receiving the payload data, information identifying a network traffic usage associated with the first spoke or the second spoke, the information identifying the network traffic usage being associated with at least one of:
network traffic usage based network resource allocation, or
network traffic usage based billing.

15. A non-transitory computer-readable medium storing instructions, the instructions comprising:
one or more instructions that, when executed by one or more processors, cause the one or more processors to:
receive configuration information associated with configuring routing for a system,
the system including a public cloud network, a private cloud network, an operator data center, and a client data center,
the public cloud network being associated with operating a web platform,
the public cloud network including a set of virtual networks, the set of virtual networks including:
a first virtual network that includes a group of development servers for developing a development update relating to the system, and
a second virtual network that includes a group of quality assurance and testing servers for performing quality assurance and testing on the development update after developing the development update,
a third virtual network that includes a group of end-to-end testing servers for performing end-to-end testing on the development update after performing quality assurance and testing;
a fourth virtual network that includes a group of staging servers for performing pre-production staging of the development update after performing end-to-end testing on the development update; and
a fifth virtual network that includes a group of production servers for implementing the development update after performing pre-production staging of the development update,
the set of virtual networks being connected in a hub-and-spoke configuration,
the private cloud network being connected to a plurality of groups of gateway devices,
a first group of gateway devices, of the plurality of groups of gateway devices, being located at the operator data center,
the first group of gateway devices providing connectivity for the operator data center to connect to the public cloud network via the private cloud network, and
the operator data center being utilized to operate the public cloud network for a client;
a second group of gateway devices, of the plurality of groups of gateway devices, being located at the client data center,
the second group of gateway devices providing connectivity for the client data center to connect to the public cloud network via the private cloud network, and the client data center utilizing the web platform and designating an operator for operating the web platform with the public cloud network,
the system being configured in a hub-and-spoke connection configuration, and
the configuration information including information identifying one or more routes for directing network traffic of the system;
selectively propagate the configuration information associated with configuring routing for the system to cause payload data to be directed via the one or more routes for directing network traffic of the system;
receive payload data for routing after selectively propagating the configuration information; and
selectively route the payload data based on the configuration information.

16. The non-transitory computer-readable medium of claim 15, where the operator data center is connected to the private cloud network via a first link associated with a first telecommunications provider, and the client data center is connected to the private cloud network via a second link associated with a second telecommunications provider,
the first telecommunications provider being different from the second telecommunications provider.

17. The non-transitory computer-readable medium of claim 15, where the configuration information is included in a community message.

18. The non-transitory computer-readable medium of claim 15, where the payload data includes order information associated with a particular store location; and
where the one or more instructions, that cause the one or more processors to selectively route the payload data, cause the one or more processors to:
selectively route the payload data to the client data center to cause the client data center to route the payload data to the particular store location.

19. The non-transitory computer-readable medium of claim 15, where the web platform includes a group of data hub servers associated with receiving orders and transmitting the orders as payload data.

20. The non-transitory computer-readable medium of claim 15, where the one or more instructions, that cause the one or more processors to receive the configuration information, cause the one or more processors to:
receive a message including the configuration information;
where the one or more instructions, when executed by the one or more processors, further cause the one or more processors to:
parse the message to determine a destination device for the message; and
where the one or more instructions, that cause the one or more processors to selectively propagate the configuration information, cause the one or more processors to:
selectively propagate the configuration information based on parsing the message.

* * * * *